United States Patent
Prud'Homme et al.

(10) Patent No.: US 6,916,481 B1
(45) Date of Patent: Jul. 12, 2005

(54) ACTIVE-SUBSTANCE VECTOR MULTIPARTICULATE SYSTEM, PRODUCTION AND USE THEREOF

(75) Inventors: Christian Prud'Homme, Lyons (FR); Etienne Fleury, Irigny (FR); Jean-Paul Michalon, Lyons (FR); Robert Zerrouk, Roquefort-les-Bains (FR)

(73) Assignees: Rhodia Chimie, Boulogne Billancourt (FR); Aventis CropScience, Lyons (FR)

( * ) Notice: Subject to any disclaimer, the term of this patent is extended or adjusted under 35 U.S.C. 154(b) by 0 days.

(21) Appl. No.: 09/958,427

(22) PCT Filed: Apr. 12, 2000

(86) PCT No.: PCT/FR00/00940

§ 371 (c)(1),
(2), (4) Date: Oct. 9, 2001

(87) PCT Pub. No.: WO00/61714

PCT Pub. Date: Oct. 19, 2000

(30) Foreign Application Priority Data

Apr. 12, 1999 (FR) .............................. 99 04526

(51) Int. Cl.⁷ ..................... A01N 25/10; A01N 43/00; A01N 43/50; A01N 43/08

(52) U.S. Cl. .................... 424/409; 424/404; 424/405; 424/406; 424/408; 424/417; 424/486; 424/78.1; 504/116.1; 504/118; 504/129; 504/139; 514/396; 514/397; 514/398; 514/471; 523/122; 523/132; 526/222; 526/225; 528/271; 528/392

(58) Field of Search ................ 424/404–407, 424/409–421, 84, 486, 78.1–78.16, 78.3, 125, 696, 724; 504/116.1, 118, 129, 139; 523/122, 132; 526/222, 225; 528/271–372, 392–425

(56) References Cited

U.S. PATENT DOCUMENTS 4,866,023 A  *  9/1989  Ritter et al. ................ 502/174
6,503,982 B2  *  1/2003  Ricca et al. ................ 524/801

\* cited by examiner

*Primary Examiner*—Neil S. Levy

(57) ABSTRACT

The invention relates to an active substance vector multiparticulate system and to the production and use thereof. The object of the invention is an active-substance vector multiparticulate system comprising one or several active substances included in a hydrophilic organic matrix comprising at least one hydrosoluble and/or hydrodispersable anionic polymer which is insolubilized by a metallic cation. The invention can be specifically used in the food industry, detergents and agrochemistry.

31 Claims, No Drawings

ACTIVE-SUBSTANCE VECTOR MULTIPARTICULATE SYSTEM, PRODUCTION AND USE THEREOF

This application is an application under 35 U.S.C. Section 371 of International Application Number PCT/FR00/00940 filed on Apr. 12, 2000.

A subject matter of the present invention is a multiparticulate carrier system for active material(s), its process of preparation and its uses.

The invention is more particularly targeted at a system in which the active material is a fragrance and which, by virtue of its solid form, can be employed as scenting additive, in particular in detergent compositions.

The invention also relates to the formulation of active material(s) in the plant-protection field.

Active materials within formulations can present problems of stability or of aggressiveness with respect to other additives in the formulation in which they are present. This is the case, for example, with fragrances, enzymes or plant-protection active materials, in particular within detergent compositions.

Likewise, some active materials can exhibit handling problems (formation of dust, difficult flowability, and the like).

In the plant-protection field, in particular in agrochemistry, weather and soil conditions can have an influence on the effectiveness and/or the persistence of action of the active materials. For example, some active materials can be rapidly decomposed by an excess of sunlight or can undergo leaching under the effect of precipitation, in particular rain.

The scenting of detergent washing compositions, in particular for washing the laundry, calls for a certain number of restrictions.

One of the first problems presented is that of finding a suitable method of addition and of distribution of the fragrance, when the latter is liquid, to and over the detergent powder.

Generally, the fragrance is finely sprayed continuously over the complete formulated powder, which is passing in transit in any kind of transporter, between the manufacturing site and the packaging site. As the fragrance is one of the most expensive components in the detergent formulation, it is necessary for the method of mixing the fragrance with the powder to allow a minimum loss of the fragrance. Observing the dosage (% of fragrance with respect to the powder) is one of the difficult elements to control and for which improvements will have to be sought, both for problems of cost and for problems of consistency of quality.

Putting the scenting composition in the solid-particulate form could represent a first improvement at this level of the process for manufacturing the detergents.

Another problem of the scenting of the detergents is that of the stability of the fragrance (and of the combination of the "notes" which it releases) during storage of the detergent in its packaging.

This is because it has been found that, during their storage, detergent powders for washing machines in particular lose from 20 to 90% of the fragrance introduced, which requires the introduction at the start of very high amounts of fragrance in order to retain a sufficient scent at the time of the use of the product.

The components of detergents are in fact highly varied and with very different chemical natures; they can attack, indeed even be incompatible with, the scenting composition which includes chemically unstable components.

Modern detergents often comprise bleaching systems based on products which release hydrogen peroxide and then active oxygen. This is then the most destabilizing element for the fragrances.

Other factors in the decomposition of the fragrances are the alkalinity of the detergent compositions, the water of crystallization, the free water, the surfactants or the sequestering agents, which are always present in detergent compositions and can interfere negatively with the fragrances.

Furthermore, in the agrochemical field, the search for novel formulating techniques is directed toward formulations capable of protecting the active materials against weather and soil conditions while maintaining and/or increasing the effectiveness of said active materials.

The Applicant Company has found a carrier system for active material(s), which is in the solid form and thus easy to handle (flowability), capable of releasing said active material only when it is applied in an aqueous medium.

In a preferred embodiment of the invention, the Applicant Company has found in particular a scenting system for the washing of the laundry which is provided in the solid form and which makes it possible to release the fragrance essentially only during the washing of the laundry.

Thus, a first subject matter of the invention is a multiparticulate carrier system (S) for active material(s) comprising at least one active material enclosed in a hydrophilic organic matrix comprising at least one water-soluble and/or water-dispersible anionic polymer (K) rendered insoluble by a metal cation.

In a preferred embodiment, the invention consists of a multiparticulate system (PS) in which the active material is a fragrance.

Another preferred alternative form of the invention is a multiparticulate system in which the active material is an active material from the plant-protection field.

Another subject matter of the invention is the process for producing said multiparticulate carrier system for active material(s), which consists in introducing the active material or materials into an aqueous dispersion comprising at least one water-soluble and/or water-dispersible anionic polymer which is formed and in rendering the anionic polymer insoluble by bringing into the presence of a metal cation, resulting in particles of polymer matrix enclosing the active material or materials.

In accordance with the process of the invention, the forming is advantageously carried out according to a technique for fragmenting into droplets.

A first embodiment of the latter is to employ an emulsification technique.

Another forming which may be suitable is the prilling technique.

Another embodiment of the multiparticulate system of the invention consists in forming the system, without involving a technique for fragmenting into droplets, but by direct precipitation of the polymer.

Other subject matters of the invention are the application of the fragrance particles, in particular in the field of detergency, and of pesticide compounds, in the field of agrochemistry.

An active material which can exist in various physical forms is involved in the system (S) of the invention.

It can be in the molecular form and thus be completely or partially dissolved in the organic matrix.

It can be in the liquid state and be provided in the form of fine droplets.

It is also possible for the active material or materials to be dissolved in a solvent.

Subsequently, the term "active material" will be understood as meaning either an active material, as such or in a solvent, or a mixture of active materials, as such or in a solvent.

The active material can also be in the solid form and can then be in the particulate state.

Said particles of active material (AM) can exhibit a mean particle size of the order of 0.1 to 500 µm, preferably of the order of 0.1 to 50 µm, very particularly from 0.2 to 10 µm.

The term "active material in the solid form" is understood to mean both an active material as such which is solid at ambient temperature and a liquid active material put into the solid form by absorption on a solid support.

Recourse is had, for the solid support of a liquid active material capable of being used, to any adsorbent and/or preferably absorbent material, preferably an inorganic material, which is inert or essentially inert with respect to odorous compounds constituting the active material and inert with respect to the polymer matrix.

Mention may be made, as examples, of inorganic adsorbent and/or absorbent materials, such as silica (in particular precipitated silica), clays (sepiolite, bentonites, montmorillonite, and the like), or zeolites of X and Y type, in particular.

These materials, in the particulate form, can exhibit a size which can vary widely, for example from 0.1 to 500 µm approximately, preferably of the order of 0.1 to 50 µm, very particularly from 0.2 to 10 µm.

The invention is preferably targeted at a carrier system for active material(s) in which the active material is a liquid. This is because the process of the invention makes it possible to trap a liquid without it being necessary to deposit it on a solid support. Thus, the invention is entirely well suited to the forming of fragrances in the liquid form, resulting in a solid scenting system (PS).

The invention also includes the case where a mixture of these physical states is present.

All the active materials, whether solid or liquid (as such or in solution of solvent), are suitable for the invention.

However, it is preferable for them to be immiscible or only very slightly miscible with water.

The term "slightly miscible" is understood to mean active materials for which the solubility in water at pH 7 does not exceed 20% by weight, preferably 10% by weight.

The invention is suitable for the formulation of numerous active materials. Examples of active materials and of fields of application illustrate the area of application of the present invention but they do not have any limiting nature.

Mention may be made, as examples of active materials used in the field of food, of mono-, di- and triglycerides, essential oils, flavorings or dyes.

Mention may be made, as examples of active materials used in the field of paints, of alkyd resins, epoxy resins, or blocked or free isocyanates.

Mention may be made, in the field of paper, as examples, of sizing and water-repelling resins, such as alkyl ketene dimer (AKD) or alkenylsuccinic anhydride (ASA).

Mention may be made, in the field of construction, of water-repelling products, such as linear, cyclic and/or branched organopolysiloxanes which can comprise, in the chain and/or at the chain end, hydroxyl or alkoxy reactive functional groups or the like.

It is likewise possible to use active materials such as lubricants for the working or the deformation of materials.

When the active material is a solvent (or a mixture of solvents) or a solution in a solvent (or several solvents), said solvent is not or is only very slightly miscible in water in the sense indicated above. Mention may be made, as examples, of the solvents employed for cleaning or pickling, such as aromatic petroleum cuts, terpene compounds, such as D-limonene or L-limonene, and solvents, such as Solvesso, aliphatic esters, such as methyl esters of a mixture of acetic, succinic and glutaric acids (mixture of acid byproducts from the synthesis of nylon), paraffin oils, such as liquid petrolatum, alkanes, chlorinated solvents, or synthetic or natural triglycerides.

Mention may be made, as examples of active materials used in the field of cosmetics, of silicone oils belonging, for example, to the family of the dimethicones.

A favored field of application of the invention is the field of plant-protection active materials. Mention may be made, inter alia, of pesticides, and, for example, fungicides, herbicides, insecticides or acaricides, or plant growth regulators.

Mention may be made, as examples of active materials (AM), of hydrophobic detergency active materials, such as, for example, bleaching catalysts, biocidal agents, bleaching activators, UV inhibitors, optical brighteners, antioxidizing agents or antifoaming agents.

Mention may be made, as examples of biocidal agents, of bactericides (triclosan, and the like) or fungicides.

Mention may be made, as examples of bleaching activators, of those generating, in the detergent medium, a peroxycarboxylic acid, such as tetraacetylethylenediamine, tetraacetylmethylenediamine, and the like.

Mention may be made, as examples of optical brighteners, of derivatives of stilbene, depyrazoline, coumarin, fumaric acid, cinnamic acid, azoles, methinecyanines or thiophenes.

Mention may be made, as examples of UV inhibitor or antioxidizing agent, of vanillin and its derivatives.

Mention may be made, as examples of bleaching catalysts, of derivatives of manganese or other metals, such as those disclosed in U.S. Pat. No. 5,246,621, U.S. Pat. No. 5,244,594, U.S. Pat. No. 5,194,416, U.S. Pat. No. 5,114,606, EP-A-549 271, EP-A-549 272, EP-A-544 440, EP-A-544 490, U.S. Pat. No. 4,430,243, U.S. Pat. No. 5,114,611, U.S. Pat. No. 4,728,455, U.S. Pat. No. 5,284,944, U.S. Pat. No. 5,246,612, and the like.

Mention may be made, in the field of detergency, as possible active material, of silicone antifoaming agents.

The present invention is very particularly targeted at a system (S) in which the active material is a fragrance; said system is called "scenting system (PS)".

The term "fragrance" is understood to mean either a scented essence or, more generally, a complex composition obtained using a mixture of numerous odorous products and of excipients which provide the homogeneity thereof.

Said mixture generally comprises at least 25% of at least one odorous compound from the group of the aliphatic or aromatic ketones, aliphatic or aromatic aldehydes, condensation products of aldehydes and of amines, aromatic or aliphatic lactones, aromatic or aliphatic ethers or esters, aliphatic alcohols, polynuclear or nonpolynuclear, terpenic, linear, cyclic or aromatic, saturated or unsaturated hydrocarbons, and the like.

The term "fragrance in the solid form" is understood to mean both a fragrance as such which is solid at ambient temperature (such as vanillin and its derivatives) and a liquid fragrance put into the solid form by absorption on a solid support.

Recourse is had, for the solid support of a liquid fragrance capable of being used, to any adsorbent and/or preferably absorbent material, preferably an inorganic material, which is inert or essentially inert with respect to odorous compounds constituting the fragrance and inert with respect to the anionic polymer and reference may be made to the abovementioned materials.

The invention is preferably targeted at a scenting system in which the fragrance is a liquid. This is because the process of the invention makes it possible to trap a liquid without it being necessary to deposit it on a solid support.

Mention may be made, as examples of odorous compounds participating in the composition of the fragrances, of:
hexylcinnamaldehyde;
2-methyl-3-(p-tert-butylphenyl)propionaldehyde,
7-acetyl-1,2,3,4,5,6,7,8-octahydro-1,1,6,7-tetramethylnaphthalene,
benzyl salicylate,
7-acetyl-1,1,3,4,4,6-hexamethyltetralin,
p-tert-butylcyclohexyl acetate,
methyl dihydrojasmonate,
β-naphthol methyl ether,
methyl β-naphthyl ketone,
2-methyl-2-(p-isopropylphenyl)propionaldehyde,
1,3,4,6,7,8-hexahydro-4,6,6,7,8,8-hexamethylcyclopenta-2-benzopyran,
dodecahydro-3a,6,6,9a-tetramethylnaphtho[2,1-b]bifuran,
anisaldehyde,
coumarin,
cedrol,
vanillin,
ethyl vanillin,
heliotropin,
ethylene brassylate,
isobornylcyclohexanol,
cyclopentadecanolide,
isoamyl acetate,
tricyclodecenyl acetate,
tricyclodecenyl propionate,
β-phenylethyl alcohol,
terpineol,
linalool,
linalyl acetate,
geraniol,
nerol,
2-(1,1-dimethylethyl)cyclohexyl acetate,
benzyl acetate,
terpenes (orange),
eugenol,
diethyl phthalate,
essential oils, resins or resinoids (oil of orange, lemon, patchouli, Peruvian balsam, olibanum resinoid, styrax, coriander, lavandin, lavender, and the like).

Although the fragrance constitutes an active material of choice according to the invention, it is possible to obtain systems (S) of all kinds.

The amount of active material(s) present in the carrier system for active material(s) of the invention depends on the nature and the amount of active material desired in said system.

When the active material is in the liquid form, this amount can represent of the order of 5 to 60% by weight of active material(s), preferably of 15 to 40%, of the total weight of the carrier system for active materials) of the invention.

The amount of polymer matrix comprising at least the polymer (K) which is involved in the system of the invention represents from 40 to 95%, preferably from 60 to 85%, by weight of the combination of active material(s) and polymer matrix.

When the active material is in the solid form, this amount can represent of the order of 0.5 to 80% by weight of active material(s), preferably of 10 to 60%, of the total weight of the carrier system for active material(s) of the invention.

In this case, the amount of polymer matrix comprising at least the polymer (K) which is involved in the system of the invention represents from 20 to 99.5%, preferably from 40 to 90%, by weight of the combination of active material(s) and polymer matrix.

According to the invention, the system (S) is provided in the form of particles, the size of which depends on the desired application. It should be noted that the method of forming determines the size of the particles obtained.

It will be specified, by way of illustration, that the size of the particles generally varies between 0.2 and 500 µm approximately, preferably of the order of 0.2 and 100 µm and very particularly between 0.3 and 10 µm, when the emulsification technique is employed.

When the prilling technique is employed, the size of the particles obtained is generally larger, of the order of 100 to 1000 µm, preferably of the order of 200 µm to 500 µm.

As regards the polymer matrix, it is composed of at least one anionic polymer and more preferably one anionic copolymer.

The term "anionic polymer or copolymer" is understood to mean a polymer comprising anionic functional groups, such as carboxylic and/or sulfonic groups.

The terms "polyfunctional" and "monofunctional" are used subsequently, which terms mean:
"polyfunctional" monomer, a monomer exhibiting at least two alike or different reactive functional groups, chosen from the carboxyl, hydroxyl and amino functional groups, capable of reacting by (trans)esterification and/or amidation and polycondensation,
"polyfunctional" unit, a polyvalent unit derived from a "polyfunctional" monomer by (trans)esterification and/or amidation and polycondensation,
"monofunctional" monomer, a monomer exhibiting a single reactive functional group, chosen from the carboxyl, hydroxyl and amino functional groups, capable of reacting by (trans)esterification and/or amidation and polycondensation,
"monofunctional" unit, a monovalent unit derived from a "monofunctional" monomer by (trans)esterification and/ or amidation and polycondensation.

Mention may be made, as polymers which are very particularly suitable, of water-soluble and/or water-dispersible copolymers chosen from water-soluble and/or water-dispersible sulfonated anionic copolyesters, sulfonated anionic copolyesteramides and sulfonated anionic copolyamides with a molecular mass by weight of at least 4 000, preferably of between 10 000 and 60 000.

The abovementioned molecular masses refer to a molecular mass by weight measured by gel permeation chromatography as specified below.

The polymers having a low molecular mass of less than or equal to 20 000 are generally called oligomers.

In the present text, with the aim of simplification, the expression "polymer" covers both copolymers with a higher molecular mass and oligomers.

The invention also includes blends of copolymers and oligomers.

Mention may be made, among the sulfonated anionic copolyesters, copolyesteramides and copolyamides which can constitute the matrix of the carrier system for active materials of the invention, of the copolymers (C) comprising at least:

alike or different, aromatic, aliphatic or cycloaliphatic, non-sulfonated dicarbonyl units (DCus), which are devoid of sulfo functional groups, units of formula:

—C(O)-A-C(O)— where
the symbol A represents a polyvalent aromatic, aliphatic or cycloaliphatic hydrocarbonaceous group,
alike or different, aliphatic, cycloaliphatic or aromatic, non-sulfonated polyfunctional units (PFus), which are devoid of sulfo functional groups, units of formula:

—X-E-Y— where
the symbols X and Y, which are identical or different, represent a following group:

| oxy | —O— | |
|---|---|---|
| imino | —NH— | |
| or (R)imino | —N(R)— | where R represents a $C_1$–$C_4$ alkyl group, | the symbol E represents a polyvalent aliphatic, cycloaliphatic or aromatic hydrocarbonaceous group optionally interrupted by one or more oxygen or tertiary nitrogen heteroatom(s), said polyvalent group being bonded to at least one X group and to at least one Y group,
sulfonated units (Sus)
alike or different, aromatic, aliphatic or cycloaliphatic, sulfonated polyfunctional units (SPFus), exhibiting at least one sulfo functional group, units of formula:

—V-Q(L-$SO_3$M)$_n$—W— where
the symbols V and W, which are identical or different, represent a following group:

| carbonyl | —C(O)— | |
|---|---|---|
| oxy | —O— | |
| imino | —NH— | |
| or (R)imino | —N(R)— | where R represents a $C_1$–$C_4$ alkyl group, | the symbol Q represents an aromatic, aliphatic or cycloaliphatic hydrocarbonaceous group,
L is a valency bond or an alkylene, alkoxyalkylene, oxyalkylene, arylene, alkylarylene or alkoxyarylene group,
M represents a hydrogen atom or an alkaline cation,
n is greater than or equal to 1,
and/or alike or different, aromatic, aliphatic or cycloaliphatic, sulfonated monofunctional units (SMFus), exhibiting at least one sulfo functional group, units of formula:

—V'-Q'(L-$SO_3$M)$_n$ where
the symbol V' represents a following group:

| carbonyl | —C(O)— |
|---|---|
| oxy | —O— | the symbol Q' represents an aromatic, aliphatic or cycloaliphatic hydrocarbonaceous group optionally interrupted by one or more oxygen heteroatom(s),
L is a valency bond or an alkylene, alkoxyalkylene, oxyalkylene, arylene, alkylarylene or alkoxyarylene group,
M represents a hydrogen atom or an alkaline cation,
n is greater than or equal to 1,
optionally alike or different, aliphatic, cycloaliphatic or aromatic, nonsulfonated polyfunctional monocarbonyl units (MCus), which are devoid of sulfo functional groups, units of formula:

—C(O)-D-Z— where the symbol Z represents a following group:

| oxy | —O— | |
|---|---|---|
| imino | —NH— | |
| or (R)imino | —N(R)— | where R represents a $C_1$–$C_4$ alkyl group, | the symbol D represents an aliphatic, cycloaliphatic or aromatic hydrocarbonaceous group,
and alike or different bonding groups (L) of formula:

—C(O)—O— and/or —O—C(O)— and/or —C(O)—N(R')— and/or —N(R')—C(O)— where R' represents H or a $C_1$–$C_4$ alkyl group.
Said sulfonated anionic copolyesters, copolyesteramides and copolyamides. (K) comprise a level of sulfonated units corresponding to a content by weight of sulfur which can be of the order of 0.5% to 8%, preferably of the order of 1.2 to 6%, with respect to said copolymer (K).
In the definition of the above units, the term "sulfonated" means the presence of at least one sulfo functional group $SO_3$M bonded to a carbon atom of a hydrocarbonaceous group; in contrast, the term "nonsulfonated" means the absence of such a functional group.
Mention may be made, among nonsulfonated dicarbonyl units (DCus), of:
aromatic units, such as the terephthaloyl, isophthaloyl, orthophthaloyl, naphthalenedicarbonyl, anthracenedicarbonyl, biphenyldicarbonyl, oxyisophthalicdicarbonyl or 4-oxyphthalicdicarbonyl unit,
aliphatic or cycloaliphatic units in which the aliphatic or cycloaliphatic residue comprises from 2 to 10 carbon atoms, such as the adipoyl, glutaroyl, succinoyl, trimethyladipoyl, pimeloyl, azeloyl, sebacoyl, suberoyl, itaconoyl, maleoyl, fumaroyl, cyclopentanedicarbonyl, cyclohexanedicarbonyl, 2-oxymethylsuccinoyl, oxymethylglutaroyl or oxyglutaroyl units.
Mention may be made, among nonsulfonated polyfunctional units (PFus), of:
aliphatic or cycloaliphatic units comprising oxy groups, such as the following units:
oxyalkyleneoxy, the alkylene residue of which is linear or branched, or oxycycloalkyleneoxy comprising from 2 to 12, preferably from 2 to 6, carbon atoms, such as the oxyethyleneoxy 1,3-propanedioxy, oxypropyleneoxy, 2,2-propanedimethoxy or 1,4-cyclohexanedimethoxy units, and their higher oxy[poly(cyclo)alkyleneoxy] homologs comprising from 2 to 150 (cyclo)alkyleneoxy units,
alkanetrioxy comprising from 3 to 6 carbon atoms, such as the 1,2,3-propanetrioxy or 1,2,4-butanetrioxy units, and their higher poly(alkanetrioxy) homologs comprising from 2 to 10 alkanetrioxy units,
aliphatic units comprising imino groups, the aliphatic residue of which is an alkylene group comprising from 2 to 150, preferably from 2 to 20, carbon atoms which can be interrupted by one or more oxygen or tertiary nitrogen heteroatoms, such as the ethylenediimino, tetramethylenediimino, hexamethylenediimino, 3-oxapentamethylenediimino or 3,6-dioxaoctamethylene-1,8-diimino units, aromatic units comprising imino groups, such as the para-phenylenediimino unit, aliphatic, aromatic or heterocyclic units comprising oxy and imino groups, the aliphatic, aromatic or heterocyclic residues of which comprise from 2 to 20 carbon atoms, such as the 5-iminopentan-1-oxy, 4-iminomethylcyclohexanemethoxy, 5-imino-2-ethylpentanoxy or oxyisophthalicdiimino units.

Mention may be made, among sulfonated polyfunctional units (SPFus), of:

aromatic dicarbonyl units in which the aromatic residue is a phenylene radical or a bivalent radical composed of a combination of several benzene nuclei which are ortho- or peri-condensed or which are bonded to one another by inert groups, such as a simple valency bond, alkylene radical, oxy group, oxo group or sulfonyl group, said aromatic residue exhibiting at least one sulfo substituent bonded to a carbon atom, such as the sulfophthaloyl, sulfoterephthaloyl, sulfoisophthaloyl, sulfoorthophthaloyl, sulfonaphthalenedicarbonyl, disulfo- and trisulfonaphthalenedicarbonyl, 5-(4-sulfophenoxy)isophthaloyl, 5-(2-sulfophenyl)isophthaloyl, 5-(4-sulfophenoxy)isophthaloyl, sulfodiphenyldicarbonyl, sulfo-4,4'-dicarbonyldiphenyl sulfone or sulfodiphenylmethane-4,4'-dicarbonyl units, aliphatic dicarbonyl units in which the aliphatic residue comprises from 2 to 10 carbon atoms, which residue is optionally substituted by at least one aryl radical, and which exhibit at least one sulfo substituent bonded to a carbon atom, such as the sulfosuccinoyl, 3-sulfoglutaroyl or 3-(4-sulfophenyl)glutaroyl units, aliphatic units comprising oxy groups in which the aliphatic residue comprises from 2 to 10 carbon atoms and which exhibit at least one sulfo substituent bonded to a carbon atom, such as the 2,3-dioxypropanesulfonic or 1,5-dioxypentane-3-sulfonic units, aliphatic units comprising oxy and carbonyl groups in which the aliphatic residue comprises from 2 to 10 carbon atoms and which exhibit at least one sulfo substituent bonded to a carbon atom, such as the 3-oxysulfopropionoyl or 5-oxy-3-sulfopentanoyl units, aromatic units comprising imino groups exhibiting at least one sulfo substituent bonded to a carbon atom, such as the p-phenylenediimino units.

Mention may be made, among sulfonated monofunctional units (SMFus), of:

aromatic units comprising a carbonyl group in which the aromatic residue is a phenyl radical or a monovalent radical composed of a combination of several benzene nuclei which are ortho- or peri-condensed or which are bonded to one another by inert groups, such as a simple valency bond, alkylene radical, oxy group, oxo group or a sulfonyl group, said aromatic residue exhibiting at least one sulfo substituent bonded to a carbon atom, such as the sulfobenzoyl units of formula:

where

M represents a hydrogen atom or an alkaline cation, optionally polyoxyalkylenated aliphatic units comprising an oxy group in which the aliphatic residue comprises from 1 to 10 carbon atoms and which exhibit at least one sulfo substituent bonded to a carbon atom, such as those of formula:

where

M represents a hydrogen atom or an alkaline cation, the symbol $R^1$ represents an ethylene and/or propylene group, the symbol $R^2$ represents an alkyl group comprising from 1 to 6 carbon atoms, m ranges from 0 to 20, preferably from 1 to 4, n is greater than or equal to 1, such as the oxypoly(ethyleneoxy)ethylsulfonate units comprising from 2 to 4 ethyleneoxy units and those of formula

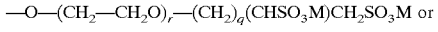

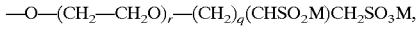

where q can range from 1 to 4 and r from 8 to 20, optionally polyoxyalkylenated aromatic units comprising oxy group, such as those of formula:

where

M represents a hydrogen atom or an alkaline cation, the symbol $R^3$ represents an ethylene and/or propylene group, q ranges from 0 to 20, such as oxypoly(ethyleneoxy)- and/or poly(propyleneoxy) phenolsulfonate units comprising up to 20 alkyleneoxy units.

Mention may be made, among optional nonsulfonated monocarbonyl polyfunctional units (MCus), of:

aliphatic or aromatic units comprising imino and carbonyl groups, the aliphatic or aromatic residue of which comprises from 2 to 20 carbon atoms, such as the 6-iminocaproyl, 3-imino-2-dimethylpropionyl or 4-(β-iminoethyl)benzoyl units, aliphatic units comprising oxy and carbonyl groups, the aliphatic residue of which comprises from 2 to 10 carbon atoms, such as the 3-oxypropionyl or 4-oxybutyryl units.

Said copolymer (C) can optionally additionally exhibit, at the chain end(s), aromatic, aliphatic or cycloaliphatic nonsulfonated monofunctional units (MFus) exhibiting a carbonyl, oxy, imino or (R)imino functional group.

Mention may be made, among these nonsulfonated monofunctional units (MFus), of the following units: benzoyl, ($C_1$–$C_{30}$)alkanemonocarbonyl, oxypoly(alkyleneoxy)alkyl, the alkyl group of which comprises from 1 to 4 carbon atoms, such as polyoxyethylene glycol monomethyl ethers comprising from 3 to 50 oxyethylene units, alkylamines, the alkyl residue of which comprises from 1 to 30 [lacuna] and is optionally interrupted by one or more nitrogen or oxygen heteroatom(s), such as octadecylamine, oxypoly(alkyleneoxy)alkylamines, such as oxypoly(ethyleneoxy)alkylamines, iminopoly(alkyleneoxy)alkylamines or iminopolyalkylenepolyamines, such as iminodiethylenediamine.

By definition, the relative amounts of (DCu), (carbonyl Su) and (MCu) units comprising carbonyl group(s) —C(O)—, on the one hand, and of (noncarbonyl Su), (PFu) and (MFu) units not exhibiting carbonyl group(s), on the other hand, present in the copolymer (C) are such that the ratio of the total number of —C(O)— groups in the copolymer (C) to the total number of —O—, —NH— and —N(R)— groups corresponding to the symbols V, W, X, Y and Z and to the —O— and optional —NH— and —N(R)— group of the reactive ends of the (SMFu) and optional (MFu) monofunctional units is of the order of 0.8 to 1.2.

Said copolymers (C) which can constitute the matrix are capable of being obtained by (trans)esterification and/or amidation and polycondensation of a monomer (M) composition comprising:

at least one nonsulfonated monomer (DCM), said monomer being aromatic, aliphatic or cycloaliphatic, devoid of a sulfo functional group and exhibiting two reactive carboxyl functional groups, at least one sulfonated monomer (SM) which is polyfunctional (SPFM) and/or monofunctional (SMFM), said monomer being aromatic, aliphatic or cycloaliphatic and exhibiting at least one sulfo functional group bonded directly or indirectly to a carbon atom of an aromatic, aliphatic or cycloaliphatic residue and two alike or different reactive functional groups chosen from the carboxyl, hydroxyl and amino functional groups or one reactive functional group chosen from the carboxyl, hydroxyl and amino functional groups, at least one nonsulfonated monomer (PFM), said monomer being aromatic, aliphatic or cycloaliphatic, devoid of a sulfo functional group and exhibiting at least two alike or different reactive functional groups chosen from the carboxyl, hydroxyl and amino functional groups, and optionally at least one nonsulfonated monomer (MCM), said monomer being aromatic, aliphatic or cycloaliphatic, devoid of a sulfo functional group and exhibiting a reactive carboxyl functional group and a reactive functional group chosen from the hydroxyl or amino functional groups, and optionally at least one nonsulfonated monofunctional monomer (MFM) exhibiting a carboxyl, hydroxyl or amino reactive functional group.

Mention may be made, among nonsulfonated monomers (DCMs) exhibiting two carboxyl reactive functional groups, of:

aromatic dicarboxylic acids, the aromatic residue of which is optionally substituted by at least one alkyl group comprising from 1 to 4 carbon atoms [lacuna] one hydroxyl group, such as phthalic, terephthalic, isophthalic or orthophthalic acids, anthracene-, 1,8-naphthalene-, 1,4-naphthalene- or biphenyldicarboxylic acids, or 5-hydroxyisophthalic, 4-hydroxyisophthalic or 4-hydroxyphthalic acids, aliphatic or cycloaliphatic dicarboxylic acids, the aliphatic or cycloaliphatic residue of which comprises from 4 to 10 carbon atoms, such as adipic, glutaric, succinic, trimethyladipic, pimelic, azelaic, sebacic, suberic, itaconic, maleic or fumaric acids, cyclopentanedicarboxylic or cyclohexanedicarboxylic acids, or 2-hydroxymethylsuccinic, hydroxymethylglutaric or hydroxyglutaric acids, in the acid, anhydride, acid chloride or lower diester (of methyl, ethyl, propyl, isopropyl or butyl, preferably methyl) form.

In the sulfonated polyfunctional monomers (SPFMs) exhibiting two alike or different reactive functional groups chosen from the carboxyl, hydroxyl and amino [—$NH_2$ or —N(R)H, where R is a $C_1$–$C_4$ alkyl group] functional groups, the sulfonated group can be bonded to a carbon atom of an arylene radical, it being possible for said arylene radical to be a phenylene radical or a bivalent radical composed of a combination of several benzene nuclei which are ortho- or peri-condensed or which are bonded to one another by inert groups, such as a simple valency bond, alkylene radical, oxy group, oxo group or sulfonyl group.

Mention may be made, as examples of combination of benzene nuclei, of the naphthalene, diphenyl, oxydiphenyl, sulfonydiphenyl or methylenediphenyl nuclei.

Said sulfonated group can also be bonded to a carbon atom of an alkylene radical, either directly or indirectly via an alkylene, alkoxyalkylene, oxyalkylene, arylene, alkylarylene or alkoxyarylene group.

Said sulfo group can be in the acid form —$SO_3H$ or a salt $SO_3M^+$, the cation of which can be an alkali metal (sodium, lithium or potassium) or an ammonium cation.

Mention may be made, as examples of sulfonated polyfunctional monomers (SPFMs), of:

those exhibiting two carbonyl reactive functional groups, such as:

aromatic dicarboxylic acids, the aromatic residue of which is optionally substituted by at least one hydroxyl substituent radical, such as sulfophthalic, sulfoterephthalic, sulfoisophthalic, sulfoorthophthalic, 4-sulfonaphthalene-2,7-dicarboxylic, 5-(4-sulfophenyl)isophthalic, 5-(2-sulfophenyl)isophthalic or 5-(4-sulfophenoxy)isophthalic acids, sulfo-4,4'-bis(hydroxycarbonyl)diphenyl sulfones, sulfodiphenyldicarboxylic acids, sulfophenyldicarboxybenzenesulfonates, sulfo-4,4'-bis(hydroxycarbonyl)diphenylmethanes, 5-(sulfophenoxy) isophthalic acids and more generally those disclosed in U.S. Pat. No. 3,734,874, aliphatic dicarboxylic acids, the aliphatic residue of which comprises from 4 to 10 carbon atoms and is optionally substituted by an aryl radical, in particular phenyl, such as sulfosuccinic, 3-sulfoglutaric or 3-(4-sulfophenyl)glutaric acids and the like, in the acid, anhydride, acid chloride or lower diester (of methyl, ethyl, propyl, isopropyl or butyl, preferably methyl) form, those exhibiting two hydroxyl reactive functional groups, such as sulfoaliphatic diols, the aliphatic residue of which comprises from 2 to 10 carbon atoms, for example 2,3-dihydroxypropanesulfonic or 1,5-dihydroxypentane-3-sulfonic acids, or aliphatic diols comprising from 2 to 3 carbon atoms substituted by poly(oxyethylene)sulfonic or poly(oxyethylene)phenolsulfonic groups, such as poly(oxyethylene)sulfonic 1,2-propanediols and poly(oxyethylene)phenylsulfonic 1,2-propanediols, those exhibiting a hydroxyl reactive functional group and a carboxyl reactive functional group, such as aliphatic hydroxy acids, the aliphatic residue of which comprises from 2 to 10 carbon atoms, such as 3-hydroxysulfopropionic or 5-hydroxy-3-sulfopentanoic acids, in the acid, acid chloride or lower ester (of methyl, ethyl, propyl, isopropyl or butyl, preferably methyl) form, those exhibiting two amino functional groups, such as 2,5-diaminobenzenesulfonic acid.

The preferred sulfonated monomers (SMs) are sulfoisophthalic and sulfosuccinic acids or their diesters and very particularly dimethyl 5-(sodiooxysulfonyl) isophthalate.

Mention may be made, as examples of sulfonated monofunctional monomers (SMFMs) exhibiting only a single hydroxyl or carboxyl reactive functional group, of:

sulfonated aromatic monocarboxylic acids, such as sulfobenzoic acid, in the acid, acid chloride or lower ester (of methyl, ethyl, propyl, isopropyl or butyl, preferably methyl) form, polyoxyalkylenated alkanesulfonates, such as ethanesulfonates, comprising from 2 to 4 oxyethylene units, polyoxyalkylenated phenolsulfonates, such as polyoxyethylenated and/or polyoxypropylenated phenolsulfonates comprising up to 20 oxyethylene units.

Mention may be made, as examples of nonsulfonated monomers (PFMs) exhibiting at least two alike or different reactive functional groups chosen from the hydroxyl and amino functional groups, of:

diols or triols comprising from 2 to 20 carbon atoms, such as:

ethylene glycol and its higher homologs which can comprise up to 20 oxyethylene units, in particular ethylene glycol, diethylene glycol and triethylene glycol, linear or branched alkylene glycols which can comprise up to 20 carbon atoms, optionally interrupted by one or more oxygen heteroatom(s), such as 1,3-propanediol, propylene glycol, dipropylene glycol, 2,2-dimethylolpropane or 1,4-cyclohexanedimethanol, glycerol, 1,2,4-butanetriol and 1,2,3-butanetriol, aliphatic diamines comprising from 2 to 20 carbon atoms, such as alkylenediamines, the alkylene group of which is optionally interrupted by one or more oxygen or tertiary nitrogen heteroatoms, such as ethylenediamine, tetramethylenediamine, hexamethylenediamine, 3-oxapentamethylenediamine or 3,6-dioxaoctamethylene-1,8-diamine, aromatic diamines, such as arylenediamines, for example p-phenylenediamine, aliphatic, aromatic or heterocyclic amino alcohols comprising from 2 to 20 carbon atoms, such as 5-aminopentanol, 4-(aminomethyl)cyclohexanemethanol or 5-amino-2-ethylpentanol.

Mention may be made, as examples of optional nonsulfonated polyfunctional monocarboxylic monomers (MCMs) exhibiting a carboxyl reactive functional group and a reactive functional group chosen from the hydroxyl and amino functional groups, of:

aromatic, aliphatic or heterocyclic monocarboxylic amino acids comprising from 2 to 20 carbon atoms and their lactams, such as 6-aminocaproic acid, caprolactam, 3-amino-2-dimethylpropionic acid or 4-(β-aminoethyl) benzoic acid, in the acid or lower ester (of methyl, ethyl, propyl, isopropyl or butyl, preferably methyl) form, aliphatic hydroxymonocarboxylic acids comprising from 2 to 10 carbon atoms, such as 3-hydroxypropionic or 4-hydroxybutyric acids or their diesters with alcohols and carboxylic acids of low molecular weight, in the acid of lower ester (of methyl, ethyl, propyl, isopropyl or butyl, preferably methyl) form.

Mention may be made, as examples of nonsulfonated monofunctional monomers (MFMs) exhibiting a single carboxyl, hydroxyl or primary or secondary amine reactive functional group, of:

benzoic acid, in the in the acid, acid chloride or lower ester (of methyl, ethyl, propyl, isopropyl or butyl, preferably methyl) form, polyoxyalkylene glycol monoalkyl ethers, the alkyl residue of which comprises from 1 to 4 carbon atoms, such as polyoxyethylene glycol monomethyl ethers comprising from 3 to 30 oxyethylene units, monoaminoalkanes comprising from 1 to 30 carbon atoms, such as monoaminooctadecane, alkylpoly(oxyalkylene)monoamines, such as the Jeffamine M products sold by Huntsman.

For correct implementation of the invention, the monomer (M) composition from which the sulfonated anionic copolymer (C) derives comprises:

a level of sulfonated monomer (SM) such that the level of sulfur present in said monomer (M) composition and originating from said monomer (SM) represents from 0.1 to 7%, preferably from 0.5 to 5%, of the weight of said monomer composition, relative amounts of (DCM), (SM), (PFM), (MCM) and (MFM) monomers such that the ratio of total number of COOH functional groups or COOH equivalents to the total number of OH, $-NH_2$ and $-N(R)H$ functional groups is of the order of 0.8 to 4.

When a copolyester is concerned, the monomer (M) composition comprises at least one nonsulfonated monomer (DCM), at least one sulfonated dicarboxylic acid, hydroxy acid or diol monomer (SPFM) and/or, carboxylic acid or hydroxyl monomer (SMFM), at least one nonsulfonated polyol monomer (PFM), optionally at least one nonsulfonated hydroxy acid monomer (MCM) and optionally at least one monofunctional hydroxyl monomer (MFM).

When a copolyesteramide is concerned, the monomer composition comprises at least one nonsulfonated monomer (DCM), at least one sulfonated dicarboxylic acid and/or hydroxy acid and/or amino acid and/or diamine monomer (SM) and/or carboxylic acid or hydroxyl monomer (SMFM), at least one nonsulfonated aminoalcohol monomer (PFM) and/or a mixture of nonsulfonated polyol and diamine monomers (PFMs) and optionally at least one nonsulfonated hydroxy acid monomer (MCM).

When a copolyamide is concerned, the monomer composition comprises at least one nonsulfonated monomer (DCM), at least one sulfonated dicarboxylic acid and/or amino acid and/or diamine monomer (SM), at least one nonsulfonated diamine monomer (PFM) and optionally at least one nonsulfonated amino acid monomer (MCM).

When a copolyester is concerned, the copolymer (C) is obtained by (trans)esterification and polycondensation reactions. Said copolymer (C) can also be obtained by (trans) esterification and polycondensation reactions of the monomers in their nonsulfonated form, followed by subsequent sulfonation of the polycondensate.

When a copolyesteramide is concerned, the copolymer (C) is obtained by (trans)esterification, amidation and polycondensation reactions.

When a copolyamide is concerned, the copolymer (C) is obtained by amidation and polycondensation (polyamidation) reactions.

Processes for the preparation of the polyesters and polyesteramides have already been disclosed in U.S. Pat. No. 3,734,874, U.S. Pat. No. 3,546,008, U.S. Pat. No. 4,233,196, U.S. Pat. No. 3,779,993, U.S. Pat. No. 4,233,196, U.S. Pat. No. 4,300,580, U.S. Pat. No. 4,304,901, U.S. Pat. No. 4,480,085, U.S. Pat. No. 5,369,210, U.S. Pat. No. 5,290,631, U.S. Pat. No. 4,721,580, U.S. Pat. No. 4,968,451, U.S. Pat. No. 5,182,043 or WO 92/04433.

Processes for the preparation of copolyamides are given in FR-A-2 722 804, JP-A-57121620 and JP-A-57126817.

Preferably, said copolymer (C) is a sulfonated anionic copolyester.

A specific embodiment of the invention is a system (S) or (PS) in which the matrix is composed of a water-dispersible or water-soluble sulfonated copolyester (C') capable of being obtained by esterification and/or transesterification and polycondensation of a monomer composition based:

on at least one nonsulfonated diacid monomer (DCM) chosen from terephthalic, isophthalic and 2,6-naphthalenedicarboxylic acids or anhydrides, or their diesters, in an amount corresponding to a (DCM)/(DCM)+(SM) molar ratio of the order of 95/100 to 60/100, preferably of the order of 93/100 to 65/100, on at least one sulfonated diacid monomer (SM) chosen from sulfoisophthalic and sulfosuccinic acids or anhydrides, and their diesters, in an amount corresponding to an (SM)/(DCM)+(SM) molar ratio of the order of 5/100 to 40/100, preferably of the order of 7/100 to 35/100, and on at least one polyol monomer (PFM) chosen from ethylene glycol, propylene glycol, diethylene glycol, dipropylene glycol, glycerol, 1,2,4-butanetriol and 1,2,3-butanetriol, according to an amount corresponding to a ratio of number of OH functional groups of the polyol monomer (PFM)/number of COOH functional groups or functional group equivalents of the diacid monomers (DCMs)+(SMs) of the order of 1.05 to 4, preferably of the order of 1.1 to 3.5 and very particularly of the order of 1.8 to 3, said sulfonated polyester (C') exhibiting a content by weight of sulfur of the order of 0.5 to 8%, preferably of the order of 1.2 to 6%.

The basic unit considered in the definition of the mole of monomer (DCM) or (SM) is the COOH functional group, in the case of diacids, or the COOH functional group equivalent, in the case of anhydrides or diesters.

The nonsulfonated diacid monomer (DCM) preferably comprises from 50 to 100 mol %, very particularly from 70 to 99 mol %, of dimethyl terephthalate and from 0 to 50 mol %, very particularly from 1 to 30 mol %, of isophthalic acid.

The sulfonated diacid monomer (SM) is highly preferably dimethyl 5-(sodiooxysulfonyl)isophthalate.

The polyol monomer (PFM) preferably employed is monoethylene glycol.

Said water-soluble and/or water-dispersible sulfonated polyesters (C') can be obtained by conventional esterification and/or transesterification and polycondensation processes, for example by an esterification and/or transesterification reaction, in the presence of an esterification/transesterification catalyst, of the polyol monomer (PFM) with the various diacid monomers, each diacid being in the acid or anhydride form or in the form of one of its diesters, and polycondensation of the polyol esters at reduced pressure, in the presence of a polycondensation catalyst.

According to a preferred method of preparation, said water-soluble and/or water-dispersible sulfonated polyesters (C') are obtained by carrying out the following successive stages:

a stage of transesterification (interexchange) between, on the one hand, the combined monomers in the dimethyl ester form and, on the other hand, an amount of polyol monomer (PFM) corresponding to a ratio of number of OH functional groups of the polyol monomer (PFM)/number of COOH functional group equivalents of said monomers in the dimethyl ester form of the order of 1.05 to 4, preferably of the order of 1.1 to 3.5 and very particularly of the order of 1.8 to 3.0, at a temperature of the order of 130 to 220° C., in the presence of a transesterification catalyst, an optional stage of esterification (in the transesterification medium) between the monomer in the diacid form and an amount of polyol monomer (PFM) corresponding to a ratio of number of OH functional groups of the polyol monomer (PFM)/number of COOH functional groups of the monomer in the diacid form of the order of 1.05 to 4, preferably of the order of 1.1 to 3.5 and very particularly of the order of 1.8 to 3.0, at a temperature of the order of 230 to 280° C., in the presence of an esterification catalyst, and a stage of polycondensation, at a temperature of the order of 230 to 280° C., in the presence of a condensation catalyst.

Said preferred copolyesters (C') can be represented by the general formula:

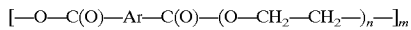

where
the symbol Ar represents a 1,4-phenylene, 1,3-phenylene or 5-sodiooxysulfonyl-1,3-phenylene residue,
n is equal to 1, 2, 3 or 4,
the molar percentage of the units of formula $(O-CH_2-CH_2-)_n$ where n is equal to 1, with respect to the combined units of formula $(O-CH_2-CH_2-)_n$ where n is equal to 1, 2, 3 and 4, being of the order of 10 to 80, preferably of the order of 20 to 60.

According to an alternative embodiment, said copolymer (C) is a sulfonated anionic copolyester which can additionally comprise:

alike or different, aromatic, aliphatic or cycloaliphatic N,N'-dicarbamyl units (DCAus) of formula:

where
the symbol E represents an aromatic, aliphatic or cycloaliphatic hydrocarbonaceous group,
polyalkyleneoxy units (PAOus) exhibiting from 5 to 150 alkyleneoxy units, the alkylene radical of which comprises from 2 to 4 carbon atoms,
and bonding groups (L') of formula $-C(O)-NH-$ and/or $-NH-C(O)-O-$.

Mention may be made, among N,N'-dicarbamyl units (DCAus), of aliphatic, cycloaliphatic or aromatic units, such as the hexamethylene-N,N'-dicarbamyl, tolylene-N,N'-dicarbamyl, isophorone-N,N'-dicarbamyl, 2-methylpentane-N,N'-dicarbamyl or norbornene-N,N'-dicarbamyl units.

Mention may be made, among polyalkyleneoxy units (PAOus), of the polyethyleneoxy and/or polypropyleneoxy units exhibiting a molecular mass of the order of 300 to 6 000, preferably of the order of 600 to 4 000.

According to this alternative form, said copolymer (C) is a sulfonated anionic copolyesterurethane (CPEU).

It can be obtained by reaction of a sulfonated anionic copolyester as defined above with a polyoxyalkylene diisocyanate exhibiting $-NCO$ end groups, the polyoxyalkylene residue of which exhibits a molecular mass of the order of 300 to 6 000, preferably of the order of 600 to 4 000, the ratio of the number of $-NCO$ functional groups to the combined OH functional groups or OH equivalents of the sulfonated anionic copolyester employed being of the order of 0.5 to 1, preferably of the order of 0.8 to 1.

The polyoxyalkylene diisocyanate can be obtained beforehand by reaction:
of at least one polyalkylene glycol, such as polyethylene glycols, with a number-average molecular mass of the order of 300 to 6 000, preferably of the order of 600 to 4 000,
and of at least one aromatic, aliphatic or cycloaliphatic diisocyanate.

Mention may be made, among diisocyanates, of toluene diisocyanate, hexamethylene diisocyanate, isophorone diisocyanate, 2-methylpentane diisocyanate or norbornene diisocyanate.

This type of copolyesterurethane (CPEU) and its method of preparation is disclosed in particular in U.S. Pat. No. 4,201,824.

Said copolymers (K) can exhibit a glass transition temperature, at 85% relative humidity, of less than or equal to 80° C., preferably of less than or equal to 60° C.

According to an alternative embodiment of the invention, said system (S) or (PS) can additionally include various organic or inorganic additives, the role of which is to improve the properties or the appearance of said system.

Such additives can, for example, have the aim of improving the stability of the active material, the mechanical properties, the appearance of said system, the flowability of the latter, and the like.

Mention may be made, as examples of additives, of:
organic or inorganic UV inhibitors which make it possible to reinforce the stability toward UV radiation of the exterior or the matrix,
antioxidizing agents which make it possible to improve the stability of the active material toward oxygen and oxidizing agents,
coloring agents,
in an amount which can range up to 10% of the weight of said system (S) or (PS),
inorganic fillers (talc and the like) which make it possible to improve the mechanical properties, the flowability of the system and the impermeability of the latter to external agents, in an amount which can range up to 95%, preferably up to 90%, of the weight of said system (S) or (PS).

Said additives can be added in particular to the polymer dispersion.

In accordance with the process of the invention, the starting material is a dispersion of anionic polymer in water. It should be noted that the invention does not exclude the case where the polymer is completely or partially dissolved.

The active material(s) in the liquid or solid form is/are subsequently introduced.

An emulsion of a liquid active material or a suspension of a solid active material in the anionic polymer is obtained, which product will subsequently be denoted active material(s)/polymeric dispersion system.

The preparation of particles including the active material(s) is carried out according to a process of dispersion in an oil of the emulsion and/or of the suspension of active materials) in the aqueous dispersion of the anionic polymer.

This results in an emulsion and/or suspension of active material(s) enclosed in an aqueous dispersion of anionic polymer in an oil phase, which corresponds, in the case of a liquid active material, to a double emulsion and, for a solid active material, to a solid in the aqueous polymer dispersion.

The particles of active material(s) are subsequently solidified.

To this end, a metal salt is added.

A first embodiment consists in adding, after the emulsification, the metal salt capable of precipitating the anionic polymer.

Another route is to add the metal salt in an unreactive form at the start, for example at the same time as the anionic polymer, and then to convert it into a reactive species in the forming stage.

The active material(s) formed is/are subsequently separated according to conventional solid/liquid separation techniques, preferably by filtration.

An alternative form of the process of the invention consists in preparing particles of active materials according to the prilling technique.

Preparation of the Active Material(s)/polymeric Dispersion System

In accordance with the process of the invention, an emulsion and/or dispersion of active material(s) in a solution and/or dispersion of the anionic polymer in water is prepared.

The starting anionic polymer is in the form of an aqueous solution and/or dispersion in the proportion of a concentration of polymer of 5 to 50% by weight, preferably of 10 to 30%.

An alternative embodiment of the invention consists in adding an emulsifier.

The emulsifying agents (EAs) which can be present are emulsifiers, preferably nonionic or anionic emulsifiers.

Mention may in particular be made, among nonionic emulsifiers, of polyoxyalkylenated derivatives, such as:
ethoxylated or ethoxy-propoxylated fatty alcohols,
ethoxylated or ethoxy-propoxylated triglycerides,
ethoxylated or ethoxy-propoxylated fatty acids,
ethoxylated or ethoxy-propoxylated sorbitan esters,
ethoxylated or ethoxy-propoxylated fatty amines,
ethoxylated or ethoxy-propoxylated di(1-phenylethyl) phenols,
ethoxylated or ethoxy-propoxylated tri(1-phenylethyl) phenols,
ethoxylated or ethoxy-propoxylated alkylphenols.

The number of oxyethylene (OE) and/or xypropylene (OP) units in these nonionic surfactants usually varies from 2 to 100 according to the desired HLB (hydrophilic/lipophilic balance). More particularly, the number of OE and/or OP units lies between 2 and 50. Preferably, the number of OE and/or OP units is between 10 and 50.

The ethoxylated or ethoxy-propoxylated fatty alcohols generally comprise from 6 to 22 carbon atoms, the OE and OP units being excluded from these numbers. Preferably, these units are ethoxylated units.

The ethoxylated or ethoxy-propoxylated triglycerides can be triglycerides of vegetable or animal origin (such as lard, tallow, groundnut oil, butter oil, cottonseed oil, linseed oil, olive oil, fish oil, palm oil, grape seed oil, soybean oil, castor oil, rapeseed oil, copra oil or coconut oil and are preferably ethoxylated.

The ethoxylated or ethoxy-propoxylated fatty acids are fatty acid (such as, for example, oleic acid or stearic acid) esters and are preferably ethoxylated.

The ethoxylated or ethoxy-propoxylated sorbitan esters are cyclized esters of sorbitol and of a fatty acid comprising from 10 to 20 carbon atoms, such as lauric acid, stearic acid or oleic acid, and are preferably ethoxylated.

The term "ethoxylated triglyceride" targets, in the present invention, both the products obtained by ethoxylation of a triglyceride with ethylene oxide and those obtained by transesterification of a triglyceride with a polyethylene glycol.

Likewise, the term "ethoxylated fatty acid" includes both the products obtained by ethoxylation of a fatty acid with ethylene oxide and those obtained by transesterification of a fatty acid with a polyethylene glycol.

The ethoxylated or ethoxy-propoxylated fatty amines generally have from 10 to 22 carbon atoms, the OE and OP units being excluded from these numbers, and are preferably ethoxylated.

The ethoxylated or ethoxy-propoxylated alkylphenols are generally ethoxylated or ethoxypropoxylated phenol compounds, the aromatic nucleus of which carries 1 or 2 linear or branched alkyl groups having 4 to 12 carbon atoms. Mention may in particular be made, by way of examples, of the octyl, nonyl or dodecyl groups.

Mention may in particular be made, as examples of nonionic surfactants of the group of the ethoxy or ethoxy-propoxylated alkylphenols, ethoxylated [lacuna] di(1-phenylethyl)phenols and ethoxy or ethoxypropoxylated tri (1-phenylethyl)phenols, of di(1-phenylethyl)phenol ethoxylated with 5 OE units, di(1-phenylethyl)phenol ethoxylated with 10 OE units, tri(1-phenylethyl)phenol ethoxylated with 16 OE units, tri(1-phenylethyl)phenol ethoxylated with 20 OE units, tri(1-phenylethyl)phenol ethoxylated with 25 OE units, tri(1-phenylethyl)phenol ethoxylated with 40 OE units, tri(1-phenylethyl)phenols ethoxy-propoxylated with 25 OE+OP units, nonylphenol ethoxylated with 2 OE units, nonylphenol ethoxylated with 4 OE units, nonylphenol ethoxylated with 6 OE units, nonylphenol ethoxylated with 9 OE units, nonyiphenols ethoxy-propoxylated with 25 OE+OP units, nonylphenols ethoxy-propoxylated with 30 OE+OP units, nonylphenols ethoxy-propoxylated with 40 OE+OP units, nonylphenols ethoxy-propoxylated with 55 OE+OP units or nonylphenols ethoxy-propoxylated with 80 OE+OP units.

Mention may be made, among anionic emulsifiers, of salts of fatty acids; alkaline alkyl sulfates (sodium lauryl sulfate), alkylsulfonates, alkylarylsulfonates, (sodium dodecylbenzenesulfonates or sodium dibutylnaphthalenesulfonate), alkyl sulfosuccinates or succinamates (disodium dioctyl sulfosuccinamate or disodium n-octadecyl sulfosuccinamate), or alkyl phosphates; sodium dodecyldiphenyl ether disulfonate; sulfonates of alkylphenolpolyglycolic ethers; salts of esters of alkylsulfopolycarboxylic acids; condensation products of fatty acids with oxy- and aminoalkanesulfonic acids; sulfated derivatives of polyglycolic ethers; sulfated esters of fatty acids and of polyglycols; or sulfated fatty acid alkanolamides.

The relative amounts of active material(s) (AM), of emulsifying agent (EA) and of anionic polymer (AP) employed are such that said emulsion, expressed on a dry basis (ingredients other than water), comprises:
from 0.5 to 80%, preferably from 10 to 60%, of their weight of active material(s) (AM),
from 20 to 95%, preferably from 40 to 90%, of their weight of anionic polymer (AP),
from 0 to 20%, preferably from 0.1 to 10%, of their weight of emulsifying agent (EA).

The amount of dry matter of the emulsion and/or dispersion obtained is generally between 10 and 60% by weight and preferably between 20 and 50% by weight.

The dispersion is prepared by simple addition of the polymer to water with vigorous stirring (for example with a propeller).

The stirring speed is not critical. It is preferably energetic, for example of the order of 1 000 revolutions/min.

The active material(s) is/are added in the liquid or solid form with stirring.

The mean particle size (D50) of the emulsion and/or dispersion can vary widely between 1 and 500 $\mu$m. It can be controlled in particular by the speed of the stirring. It depends essentially on the application envisaged. Thus, mention may be made that, for an active material intended for the detergency application, it generally varies between 100 and 400 $\mu$m, whereas, for a plant-protection application, it generally lies between 1 and 20 $\mu$m.

The preparation of the active material(s)/polymeric dispersion system can be carried out at a temperature which can advantageously be chosen within a temperature range from 20° C. to 70° C., preferably at ambient temperature (generally between 15° C. and 25° C.).

According to an alternative form of the invention, use may be made, during this operation, of an unreactive metal salt which is a metal salt which is insoluble in the presence of the anionic polymer and which will be capable of releasing its cation by addition of a reactant (RE), after the fragmentation phase, capable of dissolving it.

Mention may be made, as examples of salts, of carbonates, preferably calcium carbonate or magnesium carbonate, which can be displaced.

As regards the reactant (RE), it is generally an acid which reacts with the insoluble salt to release the metal cation in the soluble form.

From a practical viewpoint, the active material(s)/dispersion and optionally reactant (RE) system is prepared by simple mixing of its constituents with stirring using a turbine or propeller stirrer, in particular by ultrasound.

Emulsification Technique

In accordance with the process of the invention, the forming of the active material(s)/polymeric dispersion system is carried out, in a successive stage, according to several embodiments: one consisting in employing an emulsification technique and the other a prilling method.

A first alternative form consists in preparing a dispersion in a hydrophobic liquid of the active material(s)/polymeric dispersion system obtained above.

A following stage consists in precipitating the polymer by addition of a metal cation in order to obtain particles of active material(s) which are separated and optionally dried.

For the preparation of the dispersion of water-in-oil type, use is made of a water-immiscible liquid. In the continuation of the text, the term "oil" will be used generically to denote any hydrophobic organic liquid.

The term "immiscible" is synonymous with a solubility in water at pH 7 not exceeding 10% by weight.

Mention may in particular be made, as examples of organic liquids which are suitable for the invention, of vegetable, animal or synthetic oils.

Mention may in particular be made of groundnut oil, butter oil, cottonseed oil, linseed oil, olive oil, fish oil, sunflower oil, palm oil, grape seed oil, soybean oil, castor oil, rapeseed oil, copra oil or coconut oil and are preferably ethoxylated.

With regard to synthetic oils, the choice is particularly made of silicone oils, preferably polydimethylsiloxane oils, polyphenylmethylsiloxane oils or octamethylcyclotetrasiloxane, or paraffin oils.

The relative amounts of polymer (AP), of immiscible liquid (ML) and optionally of an emulsifier as mentioned above are as follows:
more than 50%, preferably from 60 to 80%, by volume of an immiscible liquid (ML),
at most 50%, preferably from 20 to 40%, by volume of the active material(s)/polymeric dispersion (AP) system,
from 0 to 20%, preferably from 0.1 to 10%, of their weight of emulsifying agent (EA).

In accordance with the process of the invention, a dispersion of the active material(s)/polymeric dispersion system in the oil is formed.

To this end, the active material(s)/polymeric dispersion system is preferably introduced into the oily phase but it is also possible to carry out the reverse.

The emulsification operation advantageously lasts between 1 min and 1 hour, depending upon the equipment used.

An oily phase comprising the active material(s)/polymeric dispersion system is obtained which exists in the form of a double emulsion, in the case of a liquid active material, and in the form of an emulsion, the dispersed phase of which is a solid, in the case of a solid active material.

The size of the droplets depends on the application envisaged.

In a following stage of the process of the invention, the polymer is rendered insoluble.

To this end, a metal cation or a reactant (RE) which releases the metal cation introduced in the first stage, according to another alternative form of the invention, is added to the emulsion obtained.

The choice of the metal cation is such that precipitation of the polymer obtained is obtained. Recourse may be had to any metal cation which is soluble in water in a pH region close to neutrality (preferably, pH=7 1).

It is advantageously a cation having a valency equal to or greater than 2.

Mention may very particularly be made of divalent cations from Group IIA of the Periodic Table, preferably alkaline earth metals, such as beryllium, magnesium, calcium or barium; from Group IB, in particular copper; or from Group IIB, in particular zinc.

Mention may be made, as examples of trivalent cations, of the cations of rare earth metal chosen from lanthanides having an atomic number of 57 to 71 and yttrium, as well as scandium, cations from Group IIIB, in particular aluminum and gallium, and from Group VIII, preferably iron.

For the definition of the elements, reference is made below to the Periodic Table of the Elements published in the Bulletin de la Société Chimique de France, No. 1 (1966).

The counteranion(s) are preferably chosen from inorganic anions, such as nitrate, sulfate, chloride, fluoride, hydrogenphosphate, phosphate, hydrogensulfate or sulfate, or organic anions, preferably acetate, and the like. The anions can be of a single category or can be composed of a mixture of categories; for reasons of simplicity, it is preferable to have only a single category or a single family of categories.

Preferably, a counteranion of halide type is chosen.

The salt more particularly employed is calcium chloride.

The amount of metal cation to be employed is generally chosen so that it is in excess with respect to the number of anionic functional groups, preferably in an excess of 100 to 200%.

The cation is generally introduced in the form of an aqueous solution. The concentration of the solution is generally dilute and it lies between 0.5 and 5 mol/l, preferably between 1 and 2 mol/l.

When the metal cation is; already present in the medium in the insoluble form (for example in the carbonate form) and when the agent which releases the metal cation in the soluble form (RE) is added, for example an inorganic or organic acid, preferably acetic acid, it is added in an amount at least equal to stoichiometry, preferably greater by 10 to 20%.

It is possible to employ all the methods for the preparation of emulsions known to a person skilled in the art and which are described in "Encyclopedia of Emulsions Technology", Volumes 1 to 3, by Paul Becher, published by Marcel Dekker, Inc., 1983.

It is also possible to prepare the emulsion by employing microfluidizers, such as Menton Gaulin and microfluidizer (microfluidics), or else, in particular in the case of a solid dispersed phase, colloid mills (Polytron and Ultra-Turrax).

A three-phase system is obtained comprising an organic phase, composed essentially of the oily phase, an aqueous phase, comprising the metal salts, and a solid.

In order to recover the solid particles, the medium is diluted with water. A large amount of water (for example equal in volume) is added, the water optionally having added to it an emulsifying agent as mentioned above at a concentration, for example, of 0.1 to 5%.

It is also possible to add a solution with a high ionic concentration, for example a solution of a halide of an alkaline earth metal, preferably calcium chloride, having a concentration varying from 0.1 to 1 mol/l.

The solid particles separate on settling and can be separated according to conventional solid/liquid separation techniques, preferably by filtration.

Washing can optionally be carried out one or more times with water or using a solvent for the oily phase, for example an aliphatic hydrocarbon, preferably heptane.

In a following stage, an operation of drying the emulsion thus formulated is carried out in order to obtain particles comprising the active material(s).

The method employed for removing the water from the emulsion and for obtaining particles can be carried out by any means known to a person skilled in the art.

Lyophilization, which corresponds to a freezing stage, followed by a sublimation stage, or alternatively drying with atomization are suitable, for example.

These drying methods, and more particularly that by atomization, are particularly indicated as they make it possible to retain the emulsion in the state in which it is found and to obtain particles directly.

The drying by atomization can be carried out in the usual way in any known device, such as, for example, an atomization tower in which spraying, carried out by a nozzle or a turbine, is combined with a stream of hot gas.

The processing conditions depend on the nature of the matrix, on the sensitivity to heat of active material(s) and on the atomizer used; these conditions are generally such that the temperature of the combined product during drying does not exceed 150° C., preferably does not exceed 110° C.

It should be noted that additives, such as anticaking agents, can be incorporated in the particles at the time of this second drying stage. It is recommended to use a filler chosen in particular from calcium, kaolin, silica, bentonite, and the like.

The polymer matrix is thus formed in the particulate form.

Prilling Technique

Another method of producing particles is the prilling technique.

The characteristic of the process of the invention, for the purpose of preparing particles of polymer matrix enclosing the active material(s), is to fragment the polymer dispersion and/or suspension comprising the active material(s) into droplets and to solidify the droplets obtained by bringing into the presence of a metal cation, so that they solidify into particles which are subsequently recovered.

A preferred alternative form of the process of the invention consists in fragmenting the polymer mass by passing the polymer dispersion and/or suspension comprising the active material(s) through a nozzle, so as to form droplets, in solidifying the latter by bringing them into contact with a metal cation, and in then recovering the particles obtained.

A preferred embodiment of the invention consists in forming the droplets by passing the mass through an orifice and very particularly by passing through a nozzle, via a flat nozzle with circular orifice(s).

The nozzle used can be a nozzle with a single hole or a nozzle with a plurality of holes, with a number of holes which can vary between 1 and 100 holes.

The diameter of the perforations of the nozzle depends on the size of the particles desired. It can be from 100 to 500 $\mu$m but it is preferably chosen between 200 and 600 $\mu$m.

The size of the perforation is always less than the size of the particle obtained. Thus, a nozzle exhibiting perforations of approximately 200 $\mu$m is used to obtain particles exhibiting a mean diameter of 600 $\mu$m.

The nozzle used can be a static nozzle but it is possible to use a nozzle subjected to a system of high frequency electrical vibration, for example from 500 to 10 000 hertz.

The following operation is to provide for the "solidification" of the droplets into particles is carried out by bringing them into contact with a solution of a metal cation as defined above. The droplets solidify on falling into the solution of said cation. This operation takes place at a temperature varying from 10° C. and 30° C., preferably at ambient temperature (15° C. to 25° C.).

At the end of the reaction, the particles are recovered as described above.

They can be dried according to the same techniques as described above.

In particular, the drying can be carried out by a gas stream (for example air), the particles being placed in a fluidized bed. The temperature of the gas stream preferably varies between 20 and 100° C. and more preferably between 30 and 60° C.

The particles of polymer mass enclosing the active material(s) thus obtained according to the process of the invention exhibit the characteristics clearly described above.

Direct Precipitation Technique

According to a third alternative form of the invention, it is possible to prepare, in the case of the use of some polymers, the multiparticulate carrier system for active material(s) of the invention according to a process of direct precipitation by the metal cation.

To this end, a metal cation is added to the active material(s)/polymeric dispersion system, the preparation of which is described above, in order to obtain particles of active material(s), which precipitate and which are separated and optionally dried.

Reference is made to the preceding description for the choice of the compounds introducing the metal cation.

It is also possible, as above, to introduce a metal cation in the insoluble form (for example in the calcium carbonate form) into the active material(s)/polymeric dispersion system, preferably during its preparation, and to subsequently add the reactant (RE) which releases the metal cation, for example acetic acid.

Solid particles are thus obtained directly, which can be separated according to conventional solid/liquid separation techniques, preferably by filtration.

They can subsequently be dried according to techniques well known to a person skilled in the art. The techniques of drying in the fluid bed and of atomization are very well suited.

This technique of preparation by direct precipitation is suitable when the polymer is an oligomer, preferably a sulfonated anionic copolyester oligomer, with a weight-average molecular mass of at most 20 000, preferably of less than 15 000 and more particularly of between 4 000 and 10 000.

Said copolyester oligomers are disclosed in particular in WO 95/32997, WO 95/2029, WO 96/18715 and WO/FR98/00496.

It is also possible to employ this alternative embodiment when a sulfonated copolyester with a higher molecular mass of greater than 20 000, preferably of between 20 000 and 60 000, is employed.

The invention also includes the case where the starting material is a polymeric dispersion comprising both blends of sulfonated copolyester oligomers and of sulfonated copolyesters.

Blends comprising at least 60% of sulfonated copolyester oligomers, preferably at least 80%, are advantageously put.

The multiparticulate carrier system for active material(s) of the invention is thus obtained, which system exists in a solid form which can be easily handled.

Whatever the method of preparation used, the particles obtained according to the invention can be redispersed in water.

The release of active material(s) during the redispersing is gradual because of the rendering of the organic matrix (OM) insoluble by the metal salt. In fact, the release is gradual owing to the fact that, on contact with water, the polymer swells, is not immediately redispersed in the water and thus retaining the active material(s) in the polymer matrix.

This is particularly the case when the multiparticulate carrier system for active material(s) is a multiparticulate carrier system for fragrance, known as a scenting system.

Another subject matter of the invention is the use of said scenting system in cosmetic compositions and in particular in detergent compositions for the washing of the laundry (industrial or household washing).

According to the invention, the multiparticulate system of the invention can be used in a proportion of approximately 0.01 to 0.5%, preferably of 0.05 to 0.2%, by weight with respect to the detergent composition.

The detergent compositions according to the invention comprise at least one surface-active agent in an amount generally of the order of 5 to 60% by weight, preferably of 8 to 50% by weight.

Mention may be made, among these, of the anionic or nonionic surface-active agents commonly used in the field of detergency for the washing of the laundry.

The detergent compositions forming the subject matter of the invention can additionally comprise conventional additives, such as inorganic or organic detergency adjuvants (builders), in an amount such that the total amount of detergency adjuvant is of the order of 5 to 80% of the weight of said composition, preferably of 8 to 40% by weight, soil-release agents, antiredeposition agents, bleaching agents, fluorescent agents, foam-suppressing agents, softening agents, enzymes and other additives.

Another subject matter of the invention is the use of the multiparticulate system for active material(s) in the plant-protection field.

This is because it has been demonstrated, surprisingly, that the use of the multiparticulate system according to the present invention in the formulation of agrochemical active materials confer entirely advantageous properties on these active materials. Thus, the inclusion of active materials in at least one multiparticulate system according to the invention makes possible in particular a significant reduction in the effect of leaching (lixiviation) by rain and a controlled release of said active materials. These effects have as direct consequences, inter alia, better effectiveness of the distributed agrochemical compounds and an improved and/or prolonged persistence of action.

Furthermore, the multiparticulate system according to the invention makes it possible to formulate one or more active materials. This system is of very particular advantage in particular in the case of active materials which are normally incompatible chemically and/or physically: the system according to the invention introduces relative "protection" of one active material with respect to the other, that is to say that the active materials are no longer incompatible when formulated with the multiparticulate system according to the invention.

It is clearly understood that the active material(s) enclosed in the multiparticulate system defined in the present description can be formulated according to conventional formulation techniques known in the field of agriculture. Such formulations comprise, for example, granules, water-soluble granules, water-dispersible granules, powders, wettable powders, flowable concentrates, suspensions, suspension concentrates, emulsions, emulsifiable concentrates, and the like.

It is also understood that such formulations can include, in addition to the active material(s) enclosed (or encapsulated) in at least one multiparticulate system, one or more identical or different additional active materials in the free form, that is to say not enclosed in the multiparticulate system. Thus, the compositions comprising, on the one hand, one or more active materials) enclosed (or encapsulated) in at least one multiparticulate system and, on the other hand, one or more active materials (which may or may not be the same) in the free form (that is to say, nonencapsulated) also form part of the present invention.

Another subject matter of the invention relates to the process for the treatment of plants or plant propagation materials using an agrochemical formulation comprising at least one particulate multiparticulate system according to the present invention. The term "plant propagation materials" is to be understood to mean seeds, cuttings, tubers, roots, and the like, and generally all organisms from which plants grow.

The examples which follow illustrate the invention without, however, limiting it.

Examples 1 to 3, 10 and 16 to 22 relate to systems in which the active material is a fragrance, while, in examples 4 to 8 and 11 to 15, the systems obtained comprise a plant-protection active material.

Example 1 illustrates the forming by prilling, examples 2 to 8 relate to the emulsification technique and examples 10 to 15 and 16 to 22 exemplify the direct precipitation method.

Example 9 is an example of plant-protection application.

The sulfonated anionic copolyester (copolyester C1) constituting the polymer matrix is obtained by esterification/transesterification and polycondensation of dimethyl terephthalate, dimethyl sodium 5-oxysulfonylisophthalate, isophthalic acid and onoethylene glycol and comprising the following units ethyleneoxy and polyethyleneoxy terephthalate (said "polyethyleneoxy" unit being composed of diethyleneoxy and/or triethyleneoxy and/or tetraethyleneoxy units), ethyleneoxy and polyethyleneoxy isophthalate (said "polyethyleneoxy" unit being composed of diethyleneoxy and/or triethyleneoxy and/or tetraethyleneoxy units), ethyleneoxy and polyethyleneoxy sulfoisophthalate (said "polyethyleneoxy" unit being composed of diethyleneoxy and/or triethyleneoxy and/or tetraethyleneoxy units), with a molar distribution of
70.7% of terephthalate units,
17.7% of isophthalate units, and
11.6% of sulfoisophthalate units,
with respect to the combined terephthalate, isophthalate and sulfoisophthalate units.

The molar percentage of the units of formula $(O-CH_2-CH_2-)_n$ where n is equal to 1, with respect to the combined units of formula $(O-CH_2-CH_2-)_n$ where n is equal to 1, 2, 3 and 4, being of the order of 60%.

Said copolyester exhibits a weight-average molecular mass of the order of 60 000–65 000, measured by gel permeation chromatography in dimethylacetamide comprising $10^{-2}$ N of LiBr at 100° C. The results are expressed in polystyrene equivalents.

The oligoester C2 employed in examples 10 to 12 is an oligoester with a weight-average molecular mass equal to 9 350 (expressed in polystyrene equivalents) and comprising the same terephthalate, isophthalate and sulfoisophthalate units with a molar distribution of:
82% of terephthalate units,
3% of isophthalate units, and
15% of sulfoisophthalate units.

The molar percentage of the units of formula $(O-CH_2-CH_2-)_n$ where n is equal to 1, with respect to the combined units of formula $(O-CH_2-CH_2-)_n$ where n is equal to 1, 2, 3 and 4, being of the order of 59%.

EXAMPLE 1

Preparation of the Copolyester Dispersion 20 g of copolyester C1 from Rhodia are gradually added with vigorous stirring to 80 g of demineralized water heated to 70° C. in a glass receptacle equipped with a magnetic stirrer.

Stirring is continued at 70° C. for 45 minutes before filtering the mixture through a cloth with a mesh size of 80 μm.

Preparation of the Dispersion of Active Material 500 g of the 20% dispersion of copolyester C1 are mixed in a glass beaker with 25 g of liquid fragrance Eagle 3000 from Givaudan-Roure.

The mixture is homogenized using ultrasound (duration: 1 min, 60% power) with a Bioblock Scientific ultrasound generator (ref. M 72412, 600 W) equipped with a probe.

Coating

The preceding emulsion is sprayed for 1 h 45 min using a nozzle above a glass receptacle equipped with a magnetic stirrer and containing 2 l of 0.1M aqueous $CaCl_2$ solution.

After stirring overnight, the solid is isolated by filtration before being dried in a fluidized bed for 30 min at 37° C.

106.5 g of white powder are thus collected.

EXAMPLE 2

The trial was carried out with the copolyester C1 defined above.

1.6 g of fragrance Eagle 3000 from Givaudan-Roure and 0.35 g of Span 85 are added to 30 g of mixture composed of:
9 g of copolyester C1,
21 g of demineralized water.

The mixture is homogenized using ultrasound (duration: 1 min, 35% power) with a Bioblock Scientific ultrasound generator, ref. M 72412, 600 W, equipped with a probe.

An emulsion is prepared in a 500 ml glass reactor equipped with a Rushton turbine by adding the preceding mixture to 200 ml of silicone oil 47 V 100, Prolabo, stirred at 700 rev/min.

After stirring for 30 min under these conditions, 250 ml of a 1M $CaCl_2$ solution comprising 1% of Tween 20 (PEG 20 sorbitan monolaurate) are added.

Stirring is maintained at 700 rev/min for 1 hour and then at 500 rev/min for 2 hours, before leaving to separate by settling.

The oily phase is separated from the aqueous phase and treated twice with 250 ml of 1M $CaCl_2$ solution comprising 1% of Tween 20. The aqueous phases are combined.

The solid which sediments is collected in order to be washed twice with 200 ml of distilled water comprising 1% of Tween 20.

After filtering and drying at ambient temperature, 8.51 g of white powder are obtained.

EXAMPLE 3

A first emulsion is prepared by mixing: 150 g of 30% by weight solution of copolyester C1 in water, 15 g of fragrance Eagle 3000 (Givaudan-Roure) and 1.5 g of Span 85 (sorbitan monolaurate).

The mixture is homogenized using ultrasound (duration: 1 min, 35% power) with a Bioblock Scientific ultrasound generator, ref. M 72412, 600 W, equipped with a probe.

The mixture is poured into a 3 l glass receptacle containing 900 ml of silicone oil 47 V 50, Prolabo, stirred at 900 rev/min with a turbine.

After stirring for 30 min at ambient temperature, 250 ml [lacuna] an emulsion are added over 20 min, the emulsion being obtained beforehand by mixing, in the presence of ultrasound, 50 ml of 1M aqueous $CaCl_2$ solution, 1.5 ml of Tween 20 and 100 ml of silicone oil 47 V 50.

Stirring is maintained for a further 30 min after the end of the addition 1 hour, then 800 ml of 1M aqueous $CaCl_2$ solution comprising 1% of Tween 20 are added.

After stirring for one hour, the mixture is left to separate by settling.

The supernatant oily phase is withdrawn.

The solid which is separated by settling in the aqueous phase is collected by filtration and washed with heptane.

After drying at ambient temperature, 41.92 g of white powder are obtained.

EXAMPLE 4

In this example, the coating of fenamidone, a fungicidal active material from Rhône-Poulenc Agro, is carried out.
Preparation of the Copolyester Dispersion (for 100 g of 30% Dispersion)

30 g of copolyester C1 from Rhodia are gradually added with vigorous stirring to 70 g of demineralized water heated to 70° C. in a glass receptacle equipped with a magnetic stirrer.

Stirring is continued at 70° C. for 45 minutes before filtering the mixture through a cloth with a mesh size of 80 μm.
Preparation of the Dispersion of Active Material 30 g of the preceding dispersion are mixed, in a glass beaker, with 20 g of fenamidone aqueous suspension concentrate, comprising 452 g of active material per kg, and 0.3 g of micronized calcium carbonate (Calofort U) sold by Rhodia Chimie.

The mixture is homogenized using ultrasound (duration: 30 s, 35% power) with a Bioblock Scientific ultrasound generator, ref. M 72412, 600 W, equipped with a microprobe.
Coating The preceding dispersion is added, in a glass reactor equipped with a Rushton turbine, to 250 ml of heptane comprising 1% (by weight) of Span 85.

The mixture is stirred at 1 100 rev/min for 15 min.

Then, 1 ml of 100% acetic acid, diluted with 20 ml of heptane, is added over 25 min using a syringe while stirring at 1 300 rev/min.

After the reactant has been run in, the mixture is stirred for a further 30 min before adding 250 ml of molar aqueous $CaCl_2$ solution comprising 1% (by weight) of Tween 20.

Stirring is continued for 2 hours before leaving to separate by settling.

The organic phase is separated and then washed with the calcium chloride solution.

The aqueous phases are combined.

The white solid which they comprise in suspension is left to separate by settling.

The solid is collected, then washed with demineralized water and finally dried by lyophilization.

18.0 g of white powder are obtained, which powder is composed of particles with a median diameter (D50, measured by laser particle sizing) equal to

EXAMPLE 5

In this example, use is made of isoxaflutole, a herbicidal active material from Rhône-Poulenc Agro.
Preparation of the Copolyester Dispersion Use is made of a 30% dispersion of copolyester C1 prepared as described above in example 4.
Preparation of the Dispersion of Active Material 22 g of the 30% dispersion of copolyester C1 are mixed, in a glass beaker, with 28 g of an isoxaflutole aqueous suspension concentrate, comprising 240 g of active material per kg, and 0.3 g of micronized calcium carbonate (Calofort U) sold by Rhodia Chimie.

The mixture is homogenized using ultrasound (duration: 1 min, 40% power) with a Bioblock Scientific ultrasound generator (ref. M 72412, 600 W) equipped with a microprobe.
Coating The preceding dispersion is added, in a glass reactor equipped with a Rushton turbine, to 250 ml of heptane comprising 1% (by weight) of Span 85.

The mixture is stirred at 1 100 rev/min for 15 min.

Then, 1 ml of 100% acetic acid, diluted with 20 ml of heptane, is added over 30 min using a syringe while stirring at 1 400 rev/min.

After the reactant has been run in, the mixture is stirred for a further 1 hour before adding 250 ml of demineralized water comprising 1% (by weight) of Tween 20.

Stirring is continued at 700 rev/min for 2 hours before leaving to separate by settling.

The aqueous phase is separated.

The white solid which it comprises in suspension is left to separate by settling.

The solid is collected, then washed with demineralized water and finally dried by lyophilization.

13.0 g of white powder are obtained, which powder is composed of particles with a median diameter D50 equal to 92 μm.

EXAMPLE 6

In this example, the coating of fenamidone is carried out.
Preparation of the Copolyester Dispersion Use is made of a 30% dispersion of copolyester C1 prepared as described above in example 4.
Preparation of the Dispersion of Active Material 20 g of the 30% dispersion of copolyester C1 are mixed, in a glass beaker, with 30 g of a fenamidone aqueous suspension concentrate, comprising 452 g of active material per kg, and 0.3 g of micronized calcium carbonate (Calofort U) sold by Rhodia Chimie.

The mixture is homogenized using ultrasound (duration: 1 min, 35% power) with a Bioblock Scientific ultrasound generator (ref. M 72412, 600 W) equipped with a microprobe.
Coating The preceding dispersion is added to a glass reactor equipped with a Rushton turbine and is diluted with 50 ml of demineralized water.

The mixture is stirred at 1 100 rev/min for 15 min.

Then, 1 ml of 100% acetic acid, diluted with 20 ml of demineralized water, is added over 29 min using a syringe while stirring at 1 300–1 400 rev/min.

After the reactant has been run in, the mixture is stirred for a further 30 min at 1 400 rev/min and then for 2 hours at 700 rev/min before leaving the white solid in suspension to separate by settling.

The solid is collected and then dried by lyophilization.

18.1 g of white powder are obtained, which powder is composed of particles with a median diameter D50 equal to 7.6 μm.

EXAMPLE 7

In this example, isoxaflutole is employed.

Preparation of the Copolyester Dispersion

Use is made of a 30% dispersion of copolyester C1 prepared as described above in example 4.

Preparation of the Dispersion of Active Material 30 g of the 30% dispersion of copolyester C1 are mixed, in a glass beaker, with 30 g of an isoxaflutole aqueous suspension concentrate, comprising 240 g of active material per kg, and 0.3 g of micronized calcium carbonate (Calofort U) sold by Rhodia Chimie.

The mixture is homogenized using ultrasound (duration: 45 s, 70% power) with a Bioblock Scientific ultrasound generator (ref. M 72412, 600 W) equipped with a microprobe.

Coating

The preceding dispersion is added to a glass reactor equipped with a Rushton turbine and is diluted with 32.5 ml of demineralized water.

The mixture is stirred at 1 100 rev/min for 15 min.

Then, 1 ml of 100% acetic acid, diluted with 20 ml of demineralized water, is added over 28 min using a syringe while stirring at 1 300–1 400 rev/min.

After the reactant has been run in, the mixture is stirred for a further 30 min at 1 400 rev/min and then for 3 hours at 700 rev/min before leaving the white solid in suspension to separate by settling.

The solid is collected and then dried by lyophilization.

19.8 g of white powder are obtained, which powder is composed of particles with a median diameter D50 equal to 17.5 μm.

EXAMPLE 8

In this example, use is made of fenamidone as a micronized powder.

Preparation of the Copolyester Dispersion

Use is made of a 30% dispersion of copolyester C1 prepared as described previously in example 4.

Preparation of the Dispersion of Active Material 30 g of the 30% dispersion of copolyester C1 are mixed, in a glass beaker, with 9 g of fenamidone as a micronized powder (D50=3.7 μm), 0.36 g of Rhodasurf 860 P (Rhodia) and 0.3 g of micronized calcium carbonate (Calofort U).

The mixture is homogenized using ultrasound (duration: 1 min, 35% power) with a Bioblock Scientific ultrasound generator (ref. M 72412, 600 W) equipped with a microprobe.

Coating

The preceding dispersion is added to a glass reactor equipped with a Rushton turbine and is diluted with 50 ml of demineralized water.

The mixture is stirred at 1 100 rev/min for 15 min.

Then, 1 ml of 100% acetic acid, diluted with 20 ml of demineralized water, is added over 30 min using a syringe while stirring at 1 300–1 500 rev/min.

After the reactant has been run in, the mixture is stirred for a further 30 min at 1 400 rev/min and then for 3 hours at 700 rev/min.

The solid in suspension is dried by lyophilization.

17.8 g of very fine white powder are obtained, which powder is composed of particles with a median diameter D50 equal to 62 μm.

EXAMPLE 9

Agrochemical Test of Effectiveness and of Persistence of Action

A wettable powder (WP1) is prepared with the following ingredients:

| | |
|---|---|
| Coated fenamidone (example 4) | 672 g |
| Supragil WP | 13 g |
| Tixosil 38 AB | 7 g |
| Supragil MNS90 | 40 g |
| Argirec B22 (q.s.) | approx. 268 g |

A second wettable powder (WP2) is prepared as above, this time using the coated fenamidone obtained in example 6.

For each of the formulations WP1 and WP2, the ingredients are weighed and then intimately mixed by mechanical mixing with an IKA paddle, so as to render the combined mixture homogeneous.

A reference formulation (aqueous suspension concentrate (SC) comprising 500 g/l of fenamidone) is prepared by mixing and then milling the following ingredients:

| | |
|---|---|
| Fenamidone | 500 g |
| Rhodasurf 860/P | 20 g |
| Sophrophor FLK | 40 g |
| Propylene glycol | 50 g |
| Rhodorsil 432 | 3 g |
| Rhodopol G | 1.5 g |
| Proxel GXL | 0.75 g |
| Water (q.s.) | approx. 490 g |

Trials are carried out in the open air on potato seedlings infested with mildew.

Four trials are carried out:
1—Control (no treatment)
2—Treatment with SC
3—Treatment with WP1
4—Treatment with WP2

20 days after the treatments, it is found that:
1—100% of the untreated seedlings are destroyed;
2—20% of the seedlings treated with SC are destroyed;
3—12.3% of the seedlings treated with WP1 are destroyed; and
4—6.7% of the seedlings treated with WP2 are destroyed.

This evaluation in the open air clearly demonstrates the superiority of persistence of action of the formulations WP1 and WP2 (active material enclosed in the multiparticulate system) with respect to a conventional formulation (SC).

EXAMPLE 10

In this example, the coating of a liquid fragrance is carried out.

12 g of copolyester C1 are dispersed, with magnetic stirring, in 240 g of demineralized water heated to 70–80° C.

As soon as the dispersion appears homogeneous, 48 g of anionic oligoester C2 are added.

Then, the mixture is left to cool to ambient temperature before increasing its pH from 3 to 7 by addition of approximately 1.3 ml of a normal sodium hydroxide solution.

Subsequently, 15 g of fragrance Eagle 3000 from Givaudan-Roure are added.

Dispersing is carried out in the presence of ultrasound (Vibra-cell 72 412 device from Bioblock Scientific, for 1 min at 70%).

The emulsion thus obtained is left to stand for 1 hour at ambient temperature before being poured, with magnetic stirring, into a receptacle comprising 300 ml of 1M $CaCl_2$ solution.

A precipitate is obtained, which precipitate is filtered through a sintered glass filter and is dried in a fluidized bed in an Aeromatic laboratory device.

76.9 g of white powder are obtained, which powder is milled until particles of approximately 300 µm on average (by sieving) are obtained.

The product comprises 18% of fragrance (by chromatographic quantitative determination).

EXAMPLE 11

In this example, use is made of isoproturon (3-(4-isopropylphenyl)-1,1-dimethylurea), an active material sold by Rhône-Poulenc Agro.
Preparation of the Dispersion of Active Material 29.6 g of oligoester C2 are dissolved in 118.4 g of demineralized water in a glass beaker equipped with a magnetic stirrer and heated to 80° C.

The solution is left to cool for 40 min with magnetic stirring before adding thereto 80 g of a 500 g/l slurry and then 1.0 g of micronized calcium carbonate (Calofort U) sold by Rhodia Chimie.

The mixture is homogenized using ultrasound (duration: 1 min, 70% power).
Coating The preceding mixture is placed in a glass reactor equipped with a Rushton turbine.

Then, 3.4 ml of 100% acetic acid, diluted with 20 ml of demineralized water, are added over 31 min using a syringe while stirring between 1 100 and 1 500 rev/min.

After the reactant has been run in, the mixture is stirred for a further 30 min at 1 100 rev/min and then for 3 hours at 900 rev/min.

A suspension of coated particles is obtained, which particles have the following particle size characteristics:

| D10 (µm) | D50 (µm) | D90 (µm) |
|---|---|---|
| 0.8 | 4.9 | 20.6 |

EXAMPLE 12

In this example, use is made of isoxaflutole, a herbicide sold by Rhône-Poulenc Agro.
Preparation of the Dispersion of Active Material 9.0 g of oligoester C2 are dissolved in 36 g of demineralized water in a glass beaker equipped with a magnetic stirrer and heated to 80° C.

The solution is left to cool for 1 hour with magnetic stirring before adding thereto 37.05 g of an aqueous suspension concentrate comprising 240 g/kg of herbicide and then 0.3 g of micronized calcium carbonate (Calofort U) sold by Rhodia Chimie.

The mixture is homogenized using ultrasound (duration: 1 min, 35% power).
Coating The preceding mixture is placed in a glass reactor equipped with a Rushton turbine.

Then, 1.0 ml of 100% acetic acid, diluted with 20 ml of demineralized water, is added over 29 min using a syringe while stirring at 1 100 rev/min.

After the reactant has been run in, the mixture is stirred for a further 30 min at 1 100 rev/min and then for 2.5 hours at 900 rev/min.

A suspension of coated particles is obtained, which particles have the following particle size characteristics:

| D10 (µm) | D50 (µm) | D90 (µm) |
|---|---|---|
| 0.6 | 2.7 | 17.5 |

EXAMPLE 13

In this example, the coating of fenamidone, a fungicide sold by Rhône-Poulenc Agro, is carried out.
Preparation of the Dispersion of Active Material 20 g of the 30% dispersion of copolyester C1 are mixed, in a glass beaker, with 30 g of a fenamidone aqueous suspension concentrate, comprising 452 g of active material per kg, and 0.3 g of micronized calcium carbonate (Calofort U) sold by Rhodia Chimie.

The mixture is homogenized using ultrasound (duration: 1 min, 35% power).
Coating The preceding dispersion is added to a glass reactor equipped with a Rushton turbine and is diluted with 50 ml of demineralized water.

The mixture is stirred at 1 100 rev/min for 15 min.

Then, 1 ml of 100% acetic acid, diluted with 20 ml of demineralized water, is added over 29 min using a syringe while stirring at 1 300–1 400 rev/min.

After the reactant has been run in, the mixture is stirred for a further 30 min at 1 400 rev/min and then for 2 hours at 700 rev/min before leaving the white solid in suspension to separate by settling.

The solid is collected and then dried by lyophilization.

18.1 g of white powder are obtained, which powder has the following particle size (with a Mastersizer S laser particle sizer from Malvern):

| D10 (µm) | D50 (µm) | D90 (µm) |
|---|---|---|
| 1.0 | 7.6 | 29 |

EXAMPLE 14

In this example, use is made of isoxaflutole.
Preparation of the Dispersion of Active Material 30 g of the 30% dispersion of copolyester C1 are mixed, in a glass beaker, with 30 g of isoxaflutole aqueous suspension concentrate, comprising 240 g of active material per kg, and 0.3 g of micronized calcium carbonate (Calofort U) sold by Rhodie Chimie.

The mixture is homogenized using ultrasound (duration: 45 s, 70% power).
Coating The preceding dispersion is added to a glass reactor equipped with a Rushton turbine and is diluted with 32.5 ml of demineralized water.

The mixture is stirred at 1 100 rev/min for 15 min.

Then, 1 ml of 100% acetic acid, diluted with 20 ml of demineralized water, is added over 28 min using a syringe while stirring at 1 300–1 400 rev/min.

After the reactant has been run in, the mixture is stirred for a further 30 min at 1 400 rev/min and then for 3 hours at 700 rev/min before leaving the white solid in suspension to separate by settling.

The solid is collected and then dried by lyophilization.

19.8 g of white powder are obtained, which powder has the following particle size:

| D10 (μm) | D50 (μm) | D90 (μm) |
|---|---|---|
| 2.7 | 20 | 47 |

EXAMPLE 15

In this example, use is made of fenamidone in the form of a micronized powder.

Preparation of the Dispersion of Active Material 30 g of the 30% dispersion of copolyester C1 are mixed, in a glass beaker, with 9 g of fungicide as a micronized powder (D50=3.7 μm), 0.36 g of Rhodasurf 860 P (Rhodia) and 0.3 g of micronized calcium carbonate (Calofort U).

The mixture is homogenized using ultrasound (duration: 1 min, 35% power).

Coating

The preceding dispersion is added to a glass reactor equipped with a Rushton turbine and is diluted with 50 ml of demineralized water.

The mixture is stirred at 1 100 rev/min for 15 min.

Then, 1 ml of 100% acetic acid, diluted with 20 ml of demineralized water, is added over 30 min using a syringe while stirring at 1 300–1 500 rev/min.

After the reactant has been run in, the mixture is stirred for a further 30 min at 1 400 rev/min and then for 3 hours at 700 rev/min.

The solid in suspension is dried by lyophilization.

17.8 g of white powder are obtained, which powder has the following particle size:

| D10 (μm) | D50 (μm) | D90 (μm) |
|---|---|---|
| 10.1 | 62 | 213 |

EXAMPLE 16

In this example, the coating of a liquid fragrance is carried out.

40 g of anionic oligoester C2 are dispersed, with magnetic stirring, in 160 ml of demineralized water heated to 80° C.

The mixture is left to cool to ambient temperature before adjusting the pH of the mixture to 7 by addition of a normal sodium hydroxide solution.

10 g of fragrance Eagle 3000 from Givaudan-Roure are subsequently added.

Dispersing is carried out in the presence of ultrasound (Vibra-cell® 72412 device from Bioblock Scientific) for 1 min at 70%.

The emulsion thus obtained is subsequently poured dropwise over 30 min into a receptacle comprising 200 ml of a 1M $CaCl_2$ solution stirred at 1 000 rev/min using a Rushton turbine.

The appearance of a precipitate is observed.

The suspension is stirred for a further 2 h 45 min before being filtered through a sintered glass filter.

The precipitate is dried in a fluidized bed with an Aeromatic laboratory device.

47.7 g of white powder are thus obtained, which powder is milled and sieved to obtain particles with a size of less than 1 mm.

EXAMPLE 17

In this example, the coating of a liquid fragrance is carried out.

8 g of copolyester C1 are dispersed, with magnetic stirring, in 160 ml of demineralized water heated to 80° C.

As soon as the mixture appears homogeneous, 32 g of anionic oligoester C2 are added.

The mixture is left to cool to ambient temperature before adjusting the pH of the mixture to 7 by addition of a normal sodium hydroxide solution (11.5 ml).

10 g of fragrance Eagle 3000 from Givaudan-Roure are subsequently added.

Dispersing is carried out in the presence of ultrasound (Vibra-cell 72412 device from Bioblock Scientific) for 1 min at 70%.

The emulsion thus obtained is subsequently poured dropwise over 20 min into a receptacle comprising 200 ml of a 200 g/l aqueous $Al_2(SO_4)_3.18H_2O$ solution stirred at 800 rev/min using a Rushton turbine.

The appearance of a precipitate is observed.

The suspension is stirred for a further 2 h 45 min before being filtered through a sintered glass filter. The filtrate is clear. The precipitate is dried in a fluidized bed with an Aeromatic laboratory device.

44.3 g of white powder are thus obtained, which powder is milled and sieved to obtain particles with a size of less than 1 mm.

Chromatographic quantitative determination indicates that all the fragrance is enclosed in the polymer.

EXAMPLE 18

In this example, the coating of a liquid fragrance is carried out.

8 g of copolyester C1 are dispersed, with magnetic stirring, in 160 ml of demineralized water heated to 80° C.

As soon as the mixture appears homogeneous, 32 g of anionic oligoester C2 are added.

The mixture is left to cool to ambient temperature before adjusting the pH of the mixture to 7 by addition of a normal sodium hydroxide solution (11 ml). 10 g of fragrance Eagle 3000 from Givaudan-Roure are subsequently added.

Dispersing is carried out in the presence of ultrasound (Vibra-cell 72412 device from Bioblock. Scientific) for 1 min at 70%.

The emulsion thus obtained is subsequently poured dropwise over 20 min into a receptacle comprising 200 ml of a 150 g/l aqueous $ZnSO_4$ solution stirred at 1 000 rev/min using a Rushton turbine.

The appearance of a precipitate is observed.

The suspension is stirred for a further 2 h 45 min before being filtered through a sintered glass filter. The filtrate is clear. The precipitate is dried in a fluidized bed with an Aeromatic laboratory device.

53.3 g of white powder are thus obtained, which powder is milled and sieved to obtain particles with a size of less than 1 mm.

Chromatographic quantitative determination indicates that all the fragrance is enclosed in the polymer.

EXAMPLE 19

In this example, the coating of a liquid fragrance is carried out.

40 g of anionic oligoester C2 are dispersed, with magnetic stirring, in 160 ml of demineralized water heated to 80° C.

The mixture is left to cool to ambient temperature before adjusting the pH of the mixture to 7 by addition of a normal sodium hydroxide solution (15 ml).

10 g of fragrance Eagle 3000 from Givaudan-Roure are subsequently added.

Dispersing is carried out in the presence of ultrasound (Vibra-cell 72412 device from Bioblock Scientific) for 1 min at 70%.

The emulsion thus obtained is subsequently poured dropwise over 25 min into a receptacle comprising 200 ml of a 150 g/l $BaCl_2.2H_2O$ solution stirred at 1 000 rev/min using a Rushton turbine.

The appearance of a precipitate is observed.

The suspension is stirred for a further 2 h 45 min before being filtered through a sintered glass filter. The filtrate is clear. The precipitate is dried in a fluidized bed with an Aeromatic laboratory device.

50.4 g of white powder are thus obtained, which powder is milled and sieved to obtain particles with a size of less than 1 mm.

EXAMPLE 20

In this example, the coating of a liquid fragrance is carried out.

25 g of anionic oligoester C2 are dispersed, with magnetic stirring, in 100 ml of demineralized water heated to 90° C.

The mixture is left to cool to ambient temperature before adjusting the pH of the mixture to 7 by addition of a normal sodium hydroxide solution. (approx. 10 ml).

25 g of fragrance Eagle 3000 from Givaudan-Roure are subsequently added.

Dispersing is carried out in the presence of ultrasound (Vibra-cell 72412 device from Bioblock Scientific) for 1 min at 70%.

The emulsion thus obtained is subsequently poured dropwise over 17 min into a receptacle comprising 200 ml of a 200 g/l $Al_2(SO_4)_3.18H_2O$ solution stirred at 1 200 rev/min using a Rushton turbine.

The appearance of a precipitate is observed.

The suspension is stirred for a further 2 h 45 min before being filtered through a cloth with a mesh size of 80 $\mu$m. The filtrate is clear. The precipitate is dried in a fluidized bed with an Aeromatic laboratory device.

50.4 g of white powder are thus obtained, which powder has particles with a size of less than 1 mm.

EXAMPLE 21

In this example, the coating of a liquid fragrance is carried out.

12 g of copolyester C1 are dispersed, with magnetic stirring, in 240 ml of demineralized water heated to 80° C.

As soon as the mixture appears homogeneous, 48 g of anionic oligoester C2 are added.

The mixture is allowed to cool to ambient temperature before adjusting the pH of the mixture to 7 by addition of a normal sodium hydroxide solution (17 ml).

15 g of fragrance Eagle 3000 from Givaudan-Roure are subsequently added.

Dispersing is carried out in the presence of ultrasound (Vibra-cell 72412 device from Bioblock Scientific) for 1 min at 70%.

The emulsion thus obtained is subsequently poured dropwise over 20 min into a receptacle comprising 300 ml of a molar aqueous $FeSO_4$ solution with magnetic stirring.

The appearance of a precipitate is observed.

The suspension is stirred for a further 2 h 45 min before being filtered through a sintered glass filter. The filtrate is clear. The precipitate is dried in a fluidized bed with an Aeromatic laboratory device.

84.4 g of white powder are thus obtained, which powder is milled and sieved to obtain particles with a size of less than 1 mm.

EXAMPLE 22

In this example, the coating of a liquid fragrance is carried out.

12 g of copolyester C1 are dispersed, with magnetic stirring, in 240 ml of demineralized water heated to 80° C.

As soon as the mixture appears homogeneous, 48 g of anionic oligoester C2 are added.

The mixture is left to cool to ambient temperature before adjusting the pH of the mixture to 7 by addition of a normal sodium hydroxide solution (17 ml).

15 g of fragrance Eagle 3000 from Givaudan-Roure are subsequently added.

Dispersing is carried out in the presence of ultrasound (Vibra-cell 72412 device from Bioblock Scientific) for 1 min at 70%.

The emulsion thus obtained is subsequently poured dropwise over 20 min into a receptacle comprising 300 ml of a molar aqueous $CuCl_2$ solution with magnetic stirring.

The appearance of a precipitate is observed.

The suspension is stirred for a further 2 h 45 min before being filtered through a sintered glass filter. The filtrate is clear. The precipitate is dried in a fluidized bed with an Aeromatic laboratory device.

77.4 g of white powder are thus obtained, which powder is milled and sieved to obtain particles with a size of less than 1 mm.

What is claimed is:

1. A multiparticulate carrier system (S) in a solid form for active material(s) comprising at least one active material enclosed in a hydrophilic organic matrix (OM) comprising at least one water-soluble or water-dispersible anionic polymer (K) rendered insoluble by a metal cation, and wherein said copolymer (K) is a sulfonated anionic copolymer comprising:

identical or different, aromatic, aliphatic or cycloaliphatic, nonsulfonated dicarbonyl units (DCus), of formula:

—C(O)-A-C(O)— wherein A is a polyvalent aromatic, aliphatic or cycloaliphatic hydrocarbon group, identical or different, aliphatic, cycloaliphatic or aromatic, nonsulfonated polyfunctional units (PFus), which are devoid of sulfo functional groups, of formula:

—X-E-Y— wherein
X and Y which are identical or different, are selected from the group consisting of the following groups:

| | |
|---|---|
| oxy | —O— |
| imino | —NH—, and |
| (R)imino | —N(R)— wherein R is a $C_1$–$C_4$ alkyl group, |

E represents a polyvalent aliphatic, cycloaliphatic or aromatic hydrocarbon group, optionally interrupted by one or more oxygen or tertiary nitrogen heteroatom(s), said polyvalent group being bonded to at least one X group and to at least one Y group, sulfonated units (Sus), selected from the group consisting of:
  identical or different, aromatic, aliphatic or cycloaliphatic, sulfonated polyfunctional units (SPFus), exhibiting at least one sulfo functional group, of formula:

—V-Q(L-$SO_3$M)$_n$—W— wherein:
  V and W, which are identical or different, are selected from the group consisting of the following groups:

| | |
|---|---|
| carbonyl | —C(O)—, |
| oxy | —O—, |
| imino | —NH—, and |
| (R)imino | —N(R)— wherein R is a $C_1$–$C_4$ alkyl group, |

Q is an aromatic, aliphatic or cycloaliphatic hydrocarbona group,
  L is a valency bond or an alkylene, alkoxyalkylene, oxyalkylene, arylene, alkylarylene or alkoxyarylene group,
  M is a hydrogen atom or an alkaline cation, and
  n is greater than or equal to 1, and identical or different, aromatic, aliphatic or cycloaliphatic, sulfonated monofunctional units (SMFus), exhibiting at least one sulfo functional group, of formula:

—V'-Q'(L-$SO_3$M)$_n$ wherein:
  V' is a group selected from group consisting of the following groups:

| | |
|---|---|
| carbonyl | —C(O)—, and |
| oxy | —O—, |

Q' is an aromatic, aliphatic or cycloaliphatic hydrocarbon group, optionally interrupted by one or more oxygen heteroatom(s),
  L is a valency bond or an alkylene, alkoxyalkylene, oxyalkylene, arylene, alkylarylene or alkoxyarylene group,
  M a hydrogen atom or an alkaline cation, and
  n is greater than or equal to 1, optionally, identical or different, aliphatic, cycloaliphatic or aromatic, nonsulfonated polyfunctional monocarbonyl units (MCus), which are devoid of sulfo functional groups, of formula:

—C(O)-D-Z- wherein:
Z is a group selected from the group consisting of the following groups:

| | |
|---|---|
| oxy | —O—, |
| imino | —NH—, and |
| (R)imino | —N(R)— wherein R is a $C_1$–$C_4$ alkyl group, and |

D is an aliphatic, cycloaliphatic or aromatic hydrocarbon group, and identical or different bonding groups (L) selected from the group consisting of groups of formula:

—C(O)—O—, —O—C(O)—, —C(O)—N(R')—, and —N(R')—C(O)—, wherein
R' is H or a $C_1$–$C_4$ alkyl group.

2. The system according to claim 1, wherein the active material(s) is used in the field of detergency, food or agrochemistry.

3. The system according to claim 1, wherein the active material(s) is a plant-protection active material(s) selected from the group consisting of fungicides, herbicides, insecticides and plant growth regulators, in a solid or liquid form.

4. The system according to claim 1, wherein the active material is in a liquid form.

5. The system according to claim 1, wherein the active material is solid or is liquid and is supported by a support material in a multiparticulate form.

6. The system according to claim 5, wherein the support material is an adsorbent or absorbent material, inert with respect to the matrix.

7. The system according to claim 6, wherein the adsorbent or absorbent material is an inorganic material.

8. The system according to claim 6, wherein the support material is a silica, a clay or a zeolite.

9. The system according to claim 1, wherein the active material is in a liquid form, said system comprising:
  from 5 to 60% by weight of active material(s), and
  from 40 to 95% by weight of polymer matrix.

10. The system according to claim 9, wherein the system comprises
  from 15 to 40% by weight of active material(s), and
  from 60 to 85% by weight of polymer matrix.

11. The system according to claim 1, wherein the active material is in a solid form, said system comprising:
  from 0.5 to 80% by weight of active material(s), and
  from 20 to 99.5% by weight of polymer matrix.

12. The system according to claim 11, wherein the system comprises:
  from 10 to 60% by weight of active material(s), and from 40 to 90% by weight of polymer matrix.

13. The system according to claim 1, being in a multiparticulate form, with a particle size being between 0.2 and 500 $\mu$m.

14. The system according to claim 13, wherein the particle size is between 0.3 and 10 μm.

15. The system according to claim 1, being in a multiparticulate form, with a particle size being between 100 and 1000 μm.

16. The system according to claim 15, wherein the particle size is between 200 μm and 500 μm.

17. The system according to claim 1, wherein the organic matrix (OM) comprises a water-soluble or water-dispersible copolymer (K) selected from the group consisting of sulfonated anionic copolyesters, sulfonated anionic copolyesteramides, and sulfonated anionic copolyamides.

18. The system according to claim 1, wherein the organic matrix (OM) comprises a copolymer (K) which is rendered insoluble by a metal cation having a valence equal to or greater than 2.

19. The system according to claim 18, wherein the metal cation is:

a divalent cation from Group IIA of the Periodic Table, from Group IB, or from Group IIB, a rare earth metal trivalent cation, a Group VII IIIB trivalent cation, or a Group IIIB trivalent cation.

20. The system according to claim 18, wherein metal cation is an alkaline earth metal cation.

21. The system according to claim 1, wherein the sulfonated anionic copolymer (K) comprises a level of sulfonated units corresponding to a content by weight of sulfur of 0.5 to 8%, with respect to said copolymer (K).

22. The system according to claim 1, wherein the copolymer (K) has, at chain end(s), aromatic, aliphatic or cycloaliphatic nonsulfonated mono-functional units (MFus) comprising a carbonyl, oxy, imino or (R)imino functional group.

23. The system according to claim 1, wherein, in the copolymer (K), the relative amounts of:

(DCu), (carbonyl Su) and (MCu) units comprising carbonyl group(s) —C(O)—, on the one hand, and of (noncarbonyl Su), (PFu) and (MFu) units not exhibiting carbonyl group(s), on the other hand, are such that the ratio of the total number of —C(O)— groups in the copolymer (K)

to the total number of —O—, —NH— and —N(R)— groups corresponding to the symbols V, W, X, Y and Z and to the —O— and optional —NH— and —N(R)— group of the reactive ends of the (SMFu) and optional (MFu) monofunctional units, is from 0.8 to 1.2.

24. The system (S) according to claim 1, further comprising at least one additive improving the stability of the active material, or the mechanical properties, appearance, or flowability of said system.

25. The system (S) according to claim 1, obtained by an emulsification or prilling technique.

26. An agrochemical composition comprising one or more agrochemical active materials enclosed in at least one multiparticulate carrier system (S) in a solid form for active material(s) comprising at least one active material enclosed in a hydrophilic organic matrix (OM) comprising at least one water-soluble or water-dispersible anionic polymer (K) rendered insoluble by a metal cation, and, wherein one of the active materials is fenamidone.

27. An agrochemical composition comprising one or more agrochemical active materials enclosed in at least one multiparticulate carrier system (S) in a solid form for active material(s) comprising at least one active material enclosed in a hydrophilic organic matrix (OM) comprising at least one water-soluble or water-dispersible anionic polymer (K) rendered insoluble by a metal cation, and, wherein one of the active materials is isoxaflutole.

28. The agrochemical composition according to claim 26, comprising at least two active materials.

29. The agrochemical composition according to claim 28, wherein two active materials at least are incompatible.

30. The agrochemical composition according to claim 27, comprising at least two active materials.

31. The agrochemical composition according to claim 30, wherein two active materials at least are incompatible.

* * * * *